(12) United States Patent
Sasaki et al.

(10) Patent No.: US 8,247,773 B2
(45) Date of Patent: Aug. 21, 2012

(54) METHOD AND APPARATUS FOR READING IDENTIFICATION MARK ON SURFACE OF WAFER

(75) Inventors: Masaharu Sasaki, Okuchi (JP); Masayoshi Omura, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 853 days.

(21) Appl. No.: 12/145,042

(22) Filed: Jun. 24, 2008

(65) Prior Publication Data

US 2009/0033912 A1 Feb. 5, 2009

(30) Foreign Application Priority Data

Jun. 26, 2007 (JP) .................................. 2007-168303
Jun. 26, 2007 (JP) .................................. 2007-168304
Jun. 26, 2007 (JP) .................................. 2007-168305

(51) Int. Cl.
*G01J 5/02* (2006.01)
*H01L 21/00* (2006.01)

(52) U.S. Cl. ................. 250/339.11; 250/341.8; 438/460; 438/461; 438/462; 438/463; 438/464; 235/901

(58) Field of Classification Search .................. 438/460, 438/461, 462, 463, 464; 235/901; 250/330, 250/332, 338.1, 339.11, 341.8
See application file for complete search history.

(56) References Cited

U.S. PATENT DOCUMENTS

| | | | |
|---|---|---|---|
| 4,812,631 A | 3/1989 | Hiramatsu | |
| 5,104,210 A * | 4/1992 | Tokas | 359/296 |
| 5,525,422 A * | 6/1996 | Spies et al. | 428/355 AC |
| 5,733,711 A | 3/1998 | Juengling | |
| 5,777,743 A * | 7/1998 | Bacchi et al. | 356/370 |
| 6,768,539 B2 | 7/2004 | Gui et al. | |
| 7,018,674 B2 | 3/2006 | Ikeda | |
| 7,064,807 B2 | 6/2006 | Gui et al. | |
| 7,084,955 B2 | 8/2006 | Gui et al. | |
| 7,113,258 B2 | 9/2006 | Van Buel et al. | |
| 2002/0109825 A1 | 8/2002 | Gui et al. | |
| 2004/0174511 A1 | 9/2004 | Gui et al. | |

(Continued)

FOREIGN PATENT DOCUMENTS

CN 1165339 A 11/1997

(Continued)

OTHER PUBLICATIONS

Translation of JP 10-247613.*

(Continued)

*Primary Examiner* — David Porta
*Assistant Examiner* — Yara Green
(74) *Attorney, Agent, or Firm* — Dickstein Shapiro LLP

(57) ABSTRACT

An identification mark constituted of irregularities is formed on the surface of a wafer, which is sealed with a resin layer and a dicing tape may be adhered to the backside. Multiple infrared units irradiate infrared rays towards the surface of the wafer from the backside thereof, wherein they transmit through the wafer and are then reflected at the interface between the resin layer and the surface of the wafer, thus producing reflected rays. An image pickup device picks up an image of the interface including the identification mark based on reflected rays. Optical axes of the infrared units extend to cross the surface of the wafer in different directions; hence, the image pickup device receives only a part of reflected rays, which are reflected at the interface in a prescribed direction. A polarizer can be arranged in proximity to the infrared unit or the image pickup device.

2 Claims, 18 Drawing Sheets

U.S. PATENT DOCUMENTS

| | | |
|---|---|---|
| 2004/0201833 A1 | 10/2004 | Gui et al. |
| 2005/0140951 A1 | 6/2005 | Van Buel et al. |
| 2005/0142815 A1 | 6/2005 | Miyazaki et al. |
| 2006/0164626 A1* | 7/2006 | Meeks et al. .................. 356/73 |
| 2006/0177954 A1 | 8/2006 | Jeong et al. |
| 2007/0020871 A1 | 1/2007 | Chen et al. |
| 2007/0068454 A1 | 3/2007 | Saeki |
| 2009/0033912 A1 | 2/2009 | Sasaki et al. |

FOREIGN PATENT DOCUMENTS

| | | |
|---|---|---|
| CN | 1484290 A | 3/2004 |
| CN | 1638095 A | 7/2005 |
| CN | 2791676 Y | 6/2006 |
| JP | 05-147723 | 6/1993 |
| JP | 10-247613 | 9/1998 |
| JP | 10-284449 A | 10/1998 |
| JP | 2003-045825 A | 2/2003 |
| JP | 2005-051018 | 2/2005 |
| JP | 2006-222142 | 8/2006 |
| JP | 2007-095780 A | 4/2007 |
| KR | 1989-7365 | 6/1989 |
| KR | 2001-0014700 | 2/2001 |

OTHER PUBLICATIONS

Japanese Office Action dated Jun. 14, 2011 Corresponding to Application No. 2007-168305.

Chinese Office Action issued for Chinese Application No. 200810129042.X, issued on Dec. 28, 2011.

Japanese Office Action corresponding to application No. JP 2007-168305, mailing date Jul. 3, 2012 (English translation attached).

* cited by examiner

METHOD AND APPARATUS FOR READING IDENTIFICATION MARK ON SURFACE OF WAFER

BACKGROUND OF THE INVENTION

1. Field of the Invention

The present invention relates to methods and apparatuses for reading identification marks indicating wafer numbers and lot numbers formed on surfaces of wafers.

The present application claims priority on Japanese Patent Application No. 2007-168303, Japanese Patent Application No. 2007-168304, and Japanese Patent Application No. 2007-168305, the contents of which are incorporated herein by reference.

2. Description of the Related Art

In factories and manufacturing sites for manufacturing semiconductor devices, multiple wafers (bundled into manufacturing lots) stored in cases are transported between multiple processes in manufacturing. Plenty of processes have been performed on wafers; hence, each wafer displays an identification mark representative of a device type, a model number, a lot number, and a wafer number, thus avoiding wafers from being erroneously identified due to complex processes.

Conventionally, laser markers are used to form identification marks on wafers, wherein marking dots are collectively formed so as to indicate prescribed numbers and characters. Identification marks can be formed on the backsides of wafers, wherein swelling portions may occur on the surfaces of wafers when the backsides of wafers are subjected to vacuum absorption for the purpose of transportation and the like. This may cause defocusing in photolithography and polish failures in chemical mechanical polishing (CMP). For this reason, identification marks have been normally formed on the surfaces of wafers.

In order to specify wafers or lots in manufacturing, identification marks have been recognized by reading apparatuses equipped with CCD cameras, for example. Some reading apparatuses for reading identification marks have been equipped with transport robots for transporting wafers to cases. This makes it possible to sort or align wafers (specified by reading apparatuses) in ascending or descending orders of numbers of identification marks into cases. This technology has been disclosed in various documents such as Patent Document 1, which teaches a physical distribution system of wafers.

Patent Document 1: Japanese Unexamined Patent Application Publication No. H05-147723

The aforementioned reading apparatus for reading identification marks formed on wafers suffer from problems in that, when the surfaces of wafers are sealed with resins covering identification marks, it is difficult to recognize the identification marks. In the manufacturing of semiconductor devices, there are provided wafers on which multiple integrated circuits (ICs) are formed on surfaces, wherein re-wirings are formed to establish electric connections between pad electrodes and integrated circuits, pillar electrode terminals (or metal posts) composed of copper are formed on re-wirings, and then the surfaces of wafers are sealed with resins. Before integrated circuits, re-wirings, and metal posts are sealed with resins, it is possible for human operators to visually recognize identification marks formed on the surfaces of wafers; however, after sealing, identification marks are completely sealed with resins; hence, it is impossible to visually specify wafer numbers and lot numbers.

Identification marks may be read before or after the dicing of wafers in manufacturing, wherein dicing tapes are adhered to the backsides of wafers, which makes it more difficult to read the identification marks.

SUMMARY OF THE INVENTION

It is an object of the present invention to provide a method and an apparatus for reading identification marks formed on the surfaces of wafers sealed with resins.

It is another object of the present invention to provide a method and an apparatus for reading the identification marks formed on the surfaces of wafers sealed with resins and attached with dicing tapes.

In a first aspect of the present invention, a method for reading an identification mark formed on the surface of a wafer sealed with a resin layer is implemented such that multiple infrared rays, which cross each other in different directions, are irradiated towards the surface of the wafer from the backside thereof; multiple infrared rays transmit through the wafer so that they are reflected at the interface between the resin layer and the surface of the wafer; then, a part of the reflected rays reflected at the interface, which propagates in a prescribed direction, is received so as to pick up an image of the identification mark constituted of irregularities (or micro projections and recesses).

In addition, an identification mark reading apparatus for reading an identification mark formed on the surface of a wafer sealed with a resin layer is constituted of a plurality of infrared units that irradiate infrared rays towards the surface of the wafer from its backside, wherein the infrared rays transmit through the wafer, and an image pickup device that receives reflected rays reflected at the interface between the resin layer and the surface of the wafer so as to pick up an image of the identification mark constituted of irregularities (or micro projections and recesses). Herein, infrared rays output from the infrared units propagate along a plurality of optical axes in different directions with respect to the surface of the wafer. In addition, the image pickup device receives a part of the reflected rays, which is reflected at the interface in a prescribed direction with respect to the surface of the wafer.

As described above, the interface between the resin layer and the surface of the wafer is photographed using infrared rays transmitting through the wafer, thus picking up an image of the interface including the identification mark. Even when the surface of the wafer having an identification mark forming region forming the identification mark is sealed with the resin layer, it is possible to reliably read the identification mark.

The surface of the wafer except for the identification mark forming region is a planar surface at which infrared rays are regularly reflected, in other words, at which infrared rays are reflected with the same angles as incidence angles thereof. Due to irregularities formed in the identification mark forming region, infrared rays are irregularly reflected at the identification mark forming region.

The image pickup device receives a part of the reflected rays (corresponding to infrared rays output from the infrared units), which is reflected at the interface so as to propagate in the prescribed direction, thus picking up the image of the interface including the identification mark. The image of the identification mark is picked up based on a relatively large amount of reflected rays which correspond to the sum of regularly reflected rays (corresponding to the infrared rays output from an infrared unit) and irregularly reflected rays (corresponding to the infrared rays output from another infrared unit). In contrast, the image of the planar surface of the wafer (except for the identification mark forming region) is picked up based on a relatively small amount of reflected rays substantially corresponding to regularly reflected rays (corresponding to infrared rays output from an infrared unit). Compared with the planar surface of the wafer, the identification mark is clearly and brightly photographed; hence, it is possible to easily read the identification mark.

It is preferable that infrared rays propagate along multiple optical axes, each of which intersects at an acute angle compared with the perpendicular of the surface of the wafer. In other words, it is preferable that each of optical axes of the infrared units be inclined at an acute angle compared with the perpendicular of the surface of the wafer. This increases the number of reflected rays corresponding to irregularly reflected rays reflected at the identification mark forming region; hence, it is possible to pick up a clear and bright image of the identification mark.

It is preferable that infrared rays propagate along multiple optical axes, which mutually intersect each other at either a right angle or an obtuse angle therebetween in the plane lying along the surface of the wafer. In other words, it is preferable that optical axes of the infrared units intersect each other at either a right angle or an obtuse angle therebetween in the plane lying along the surface of the wafer.

In the above, the identification mark is constituted of multiple thin line segments each defined by a length and a width, wherein each line segment is constituted of small dimples (or dots) formed on the surface of the wafer.

The present invention is capable of easily reading the identification mark constituted of thin line segments.

A relatively large number of dots included in the line segment may not be irradiated with infrared rays output from an infrared unit when the optical axis of infrared rays output from the infrared unit substantially matches the length of the line segment or when the optical axis is inclined with the length of the line segment with a small inclination angle (e.g. 45° or less). That is, a part of the line segment cannot be photographed using the infrared rays of the infrared unit only; hence, an inadequate image may be picked up with respect to the line segment.

In the present invention, the optical axis of infrared rays output from another infrared unit crosses the optical axis of infrared rays output from one infrared unit at a right angle or an obtuse angle in the plane lying along the surface of the wafer, wherein the optical axis of another infrared unit crosses the length of the line segment at a right angle, or the optical axis of another infrared unit is inclined with the length of the line segment with a large inclination angle (e.g. 45° or more). This reduces the number of dots (included in the line segment) that are not irradiated with infrared rays; hence, it is possible to entirely pick up the image of the line segment with a high clearness and brightness.

In addition, it is possible to increase the inter-axis angle between optical axes for propagating regularly reflected rays in the plane lying along the surface of the wafer. That is, it is possible to easily arrange the optical axis of the optical system of the image pickup device. This makes it possible to prevent the image pickup device from receiving regularly reflected rays, which are regularly reflected at the planar surface of the wafer except for the identification mark forming region. That is, the image pickup device does not receive regularly reflected rays, which are regularly reflected at the planar surface of the wafer except for the identification mark forming region, but receives only irregularly reflected rays, which are irregularly reflected at the identification mark forming region and based on which the image of the identification mark is easily picked up.

It is preferable that the interface is photographed using reflected rays corresponding to infrared rays reflected in a direction inclined with the surface of the wafer. In other words, it is preferable that the optical axis of the image pickup device be inclined with respect to the surface of the wafer.

In the above, it is possible to receive intensely reflected rays corresponding to infrared rays irregularly reflected at the identification mark forming region; hence, it is possible to pick up the image of the identification mark with a high clearness and brightness.

As a result, the present invention is capable of easily reading the identification mark formed on the surface of the wafer sealed with the resin layer.

In a second aspect of the present invention, an identification mark reading apparatus for reading an identification mark formed on the surface of a wafer sealed with a resin layer is constituted of a stage for mounting the wafer, at least one infrared unit for irradiating infrared rays towards the surface of the wafer from the backside thereof, wherein the stage allows infrared rays and reflected rays to pass therethrough, an image pick up device for receiving reflected rays corresponding to infrared rays reflected at the interface between the resin layer and the surface of the wafer, thus picking up an image of the identification mark constituted of irregularities, and an optical transmission limiter for limiting the transmission of rays therethrough. The optical transmission limiter is positioned between the stage and the infrared unit or between the stage and the image pickup device, thus reducing the amount of reflected rays which are reflected at the surface of the wafer except for the identification mark and which are then received by the image pickup device.

In a method for reading an identification mark formed on the surface of a wafer sealed with a resin layer, infrared rays are irradiated towards the surface of the wafer from the backside thereof, so that infrared rays are reflected at the interface between the resin layer and the surface of the wafer; then, the reflected rays are received so as to pick up an image of the surface of the wafer, thus reading the identification mark constituted of irregularities from the image, wherein infrared rays or reflected rays are limited so as to reduce the amount of reflected rays reflected at the surface of the wafer except for the identification mark.

By use of infrared rays transmitted through the wafer, it is possible to produce the image of the interface including the identification mark. That is, even when the surface of the wafer having the identification mark is sealed with the resin layer, it is possible to easily read the identification mark. Since the surface of the wafer except for the identification mark forming region is substantially planar, infrared rays are regularly reflected at the planar surface of the wafer such that they are reflected with substantially the same angle as the incidence angle thereof. Infrared rays are irregularly reflected at the identification mark forming region having irregularities.

That is, it is possible to relatively increase the amount of irregularly reflected rays at the identification mark forming region by reducing the amount of regularly reflected rays at the planar surface of the wafer except for the identification mark forming region. This makes it possible to produce an image with a high S/N ratio, wherein a relatively high contrast emerges between the planar surface and the identification mark forming region; hence, it is possible to easily read the identification mark.

It is preferable that the optical transmission limiter be a polarizer for reducing the amount of S polarizing components of infrared rays. That is, infrared rays or reflected rays are limited in transmission by reducing the amount of S polarizing components.

In general, regularly reflected rays are enhanced in S polarizing components emerging in parallel with the planar surface of the wafer except for the identification mark forming region and the backside of the wafer. In contrast, irregularly reflected rays at the identification mark forming region are relatively enhanced in P polarizing components. Since the polarizer reduces the amount of S polarizing components, the image pickup device is capable of selectively receiving reflected rays including P polarizing components other than reflected rays including S polarizing components reflected at the planar surface or backside of the wafer. Therefore, the image pickup device receives a relatively small amount of reflected rays at the backside or planar surface of the wafer except for the identification mark forming region; hence, it is possible to produce the image of the identification mark with a high S/N ratio.

When infrared rays are irradiated towards the surface of the wafer with the prescribed incidence angle that is set to increase the difference between S polarizing components and P polarizing components, it is possible to effectively demonstrate the filtering effects of the polarizer regarding the S polarizing components; hence, it is possible to further increase the contrast in image between the planar surface and the identification mark forming region. Specifically, the incidence angle of infrared rays, which increases S polarizing components rather than P polarizing components in reflected rays at the backside or the planar surface other than the identification mark forming region, ranges from 50° to 85°, preferably, ranging from 60° to 80°, and more preferably, ranging from 65° to 75°.

The polarizer is positioned between the stage and the infrared unit, thus reducing the amount of S polarizing components in infrared rays propagating towards the backside of the wafer. Since infrared rays whose S polarizing components are reduced are irradiated to the backside of the wafer, it is possible to reduce the amount of reflected rays at the entire planar surface other than the identification mark forming region; hence, it is possible to relatively enhance the image of the identification mark forming region based on irregularly reflected rays.

The polarizer can be positioned between the stage and the image pickup device, thus reducing the amount of S polarizing components in reflected rays. In this case, numerous reflected rays occur on the planar surface except for the identification mark forming region; however, the polarizer limits S polarizing components from being transmitted therethrough within reflected rays, thus selectively transmitting P polarizing components therethrough.

When the stage is composed of a transparent material allowing infrared rays to transmit therethrough so that the polarizer is attached to the stage, it is unnecessary to adjust each polarizer in position and direction; hence, it is possible to improve operability and performability. This also reduces limitations regarding the arrangement of the infrared unit and the image pickup device. Thus, it is possible to easily read the identification mark, which can be formed at any position on the wafer.

The optical transmission device is constituted of the micro-louver film arranged between the stage and the image pickup device, wherein the micro-louver film blocks regularly reflected rays at the planar surface except for the identification mark forming region. That is, irregularly reflected rays at the identification mark are selectively transmitted through micro louvers, thus enhancing the contrast with respect to the identification mark.

Multiple infrared units are arranged to irradiate infrared rays towards the surface of the wafer along multiple optical axes intersecting each other in different directions, while the image pickup device is positioned to selectively receive reflected rays that are reflected at the interface in the prescribed direction.

Since infrared rays are irradiated towards the surface of the wafer in different directions, it is possible to produce a clear image of the identification mark. In particular, it is possible to easily recognize linear portions of the identification mark. By appropriately changing incidence angles and wavelengths of infrared rays, the identification mark reading apparatus is capable of reading any type of identification marks having irregularities.

As described above, it is possible to easily read the identification mark formed on the surface of the wafer sealed with the resin layer, wherein infrared rays are limited in transmission so as to reduce the amount of reflected rays at the planar surface except for the identification mark forming region; hence, it is possible to enhance the contrast with respect to the identification mark, which can therefore be easily recognized.

In a third aspect of the present invention, an identification mark is formed on the surface of a wafer sealed with a resin layer and is read such that a dicing tape ensuring transmission of infrared radiation is attached onto a backside of the wafer; infrared rays are irradiated towards the surface of the wafer from the backside; then, reflected rays corresponding to the infrared rays, which are sequentially transmitted through the dicing tape and the wafer and are then reflected at the interface between the resin layer and the surface of the wafer, are received so as to pick up an image of the interface including the identification mark composed of irregularities.

In the above, the dicing tape having a high transmission ratio of infrared rays is attached to the backside of the wafer, wherein infrared rays irradiated onto the backside of the wafer are sequentially transmitted through the dicing tape and the wafer. Reflected rays at the interface are sequentially transmitted through the wafer and the dicing tape. The image of the interface is produced based on reflected rays; thus, it is possible to easily read the identification mark even when the surface of the wafer is sealed with the resin layer, and the dicing tape is attached to the backside of the wafer.

In the above, the dicing tape can be composed of a polarizing material for reducing S polarizing components in infrared rays. In this case, infrared rays, which pass through the dicing tape and the wafer so as to reach the interface, include a relatively large amount of P polarizing components but do not substantially include S polarizing components. Regularly reflected rays reflected at the planar surface of the wafer except of the identification mark forming region (or the backside of the wafer) include a relatively large amount of S polarizing components that vibrate in parallel with the planar surface. In contrast, irregularly reflected rays reflected at the identification mark forming region are enhanced in P polarizing components. The dicing tape reduces S polarizing components included in regularly reflected rays and irregularly reflected rays; thus, the image is produced based on reflected rays including P polarizing components rather than S polarizing components. In other words, it is possible to reduce regularly reflected rays (reflected at the planar surface) but to increase irregularly reflected rays (reflected at the identification mark forming region), whereby the image includes a clear and bright image of the identification mark.

When infrared rays are irradiated onto the surface of the wafer at a prescribed incidence angle that increases the difference between S polarizing components and P polarizing components, it is possible to effectively demonstrate the filtering effects of the dicing tape with respect to S polarizing components of infrared rays. For example, the incidence angle, which reduces P polarizing components but increases S polarizing components in reflected rays reflected at the planar surface except for the identification mark forming region, ranges from 50° 85°, preferably, ranging from 60° to 80°, and more preferably, ranging from 65° to 75°.

In addition, infrared rays can be irradiated along multiple optical axes lying in different directions towards the surface of the wafer, so that a part of the reflected rays, which is reflected at the interface in a prescribed direction, is received so as to pick up the image of the interface including the identification mark. This makes the identification mark clear in the image; in particular, it is possible to easily recognize linear portions of the identification mark. Furthermore, it is possible to read various types of identification marks composed of irregularities by appropriately changing the incidence angle and the wavelength of each infrared unit.

As described above, it is possible to easily read the identification mark formed on the surface of the wafer even when the surface of the wafer is sealed with the resin layer, and the dicing tape is attached to the backside of the wafer.

BRIEF DESCRIPTION OF THE DRAWINGS

These and other objects, aspects, and embodiments of the present invention will be described in more detail with reference to the following drawings, in which:

FIG. 5 is a plan view of the identification mark reading apparatus for reading the identification mark of the wafer by means of two infrared units and the infrared camera;

FIG. 6 is a side view of the identification mark reading apparatus;

DESCRIPTION OF THE PREFERRED EMBODIMENTS

The present invention will be described in further detail by way of examples with reference to the accompanying drawings.

1. First Embodiment

Figure 7:
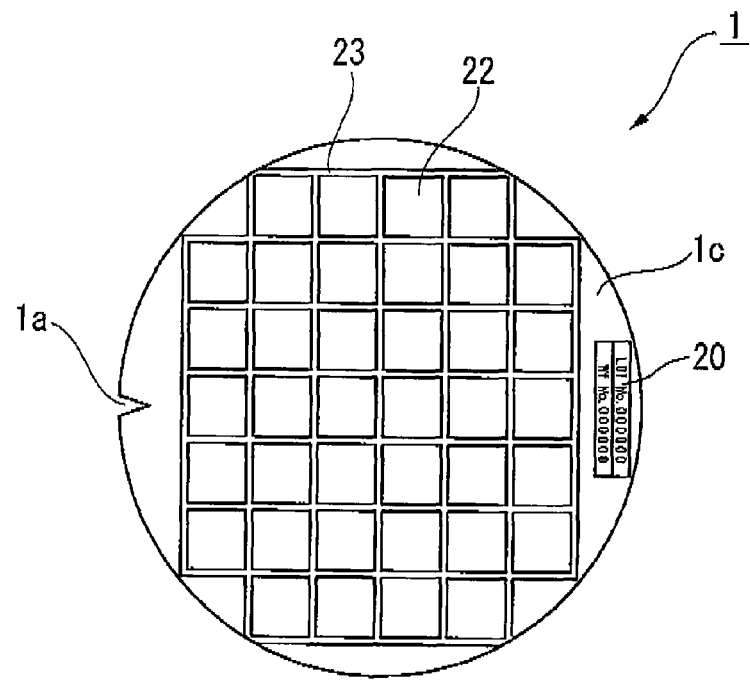
FIG. 7 is a plan view showing the wafer having multiple integrated circuits and the identification mark as well as a notch for use in positional detection of the wafer.
Figure 8:
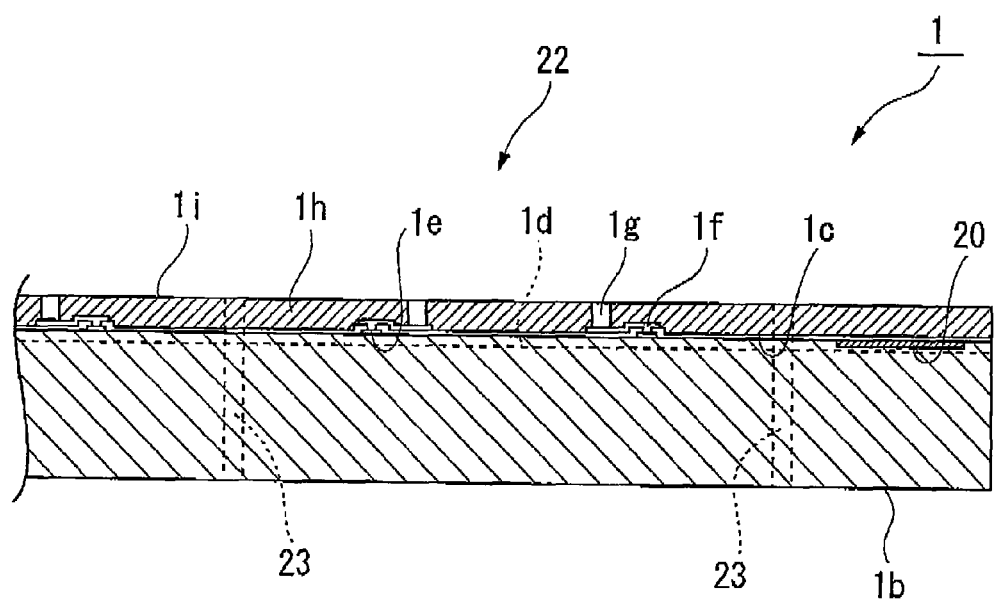
FIG. 8 is an enlarged sectional view showing essential parts of the wafer.

A method and an apparatus for reading identification marks formed on surfaces of wafers will be described in accordance with a first embodiment of the present invention with reference to FIGS. 1 to 8. FIGS. 7 and 8 show a wafer 1 having a disk-like shape composed of a polycrystal silicon or monocrystal silicon. Integrated circuits (ICs) 1*d*, pad electrodes 1*e*, re-wires 1*f* (which are electrically connected to the ICs 1*d* via the pad electrodes 1*e*), and pillar electrode terminals (or metal posts) 1*g* (which are formed on the re-wires 1*f*) are formed on a surface 1*c* of the wafer 1. A resin layer (or a resin seal) 1*h* is formed on the surface 1*c* of the wafer 1 so as to seal the ICs 1*d*, the re-wires 1*f*, and the metal posts 1*g*. A surface 1*i* of the resin layer 1*h* is formed opposite to and in parallel with the surface 1*c* of the wafer 1, wherein the upper surfaces of the metal posts 1*g* are exposed in the same plane as the surface 1*i*.

A notch (i.e. a V-shaped cutout) 1*a* is formed by cutting out a V-shaped region of the external portion of the wafer 1. It serves as a mark for specifying the position of the wafer 1. A plurality of lattice portions is defined on the surface 1*c* of the wafer 1 by dicing lines 23, along which the wafer 1 is subjected to dicing so as to produce individual pieces each corresponding to a semiconductor device 22. That is, a square portion (or a rectangular portion) defined by the dicing lines 23 forms each single semiconductor device 22.

Figure 3:
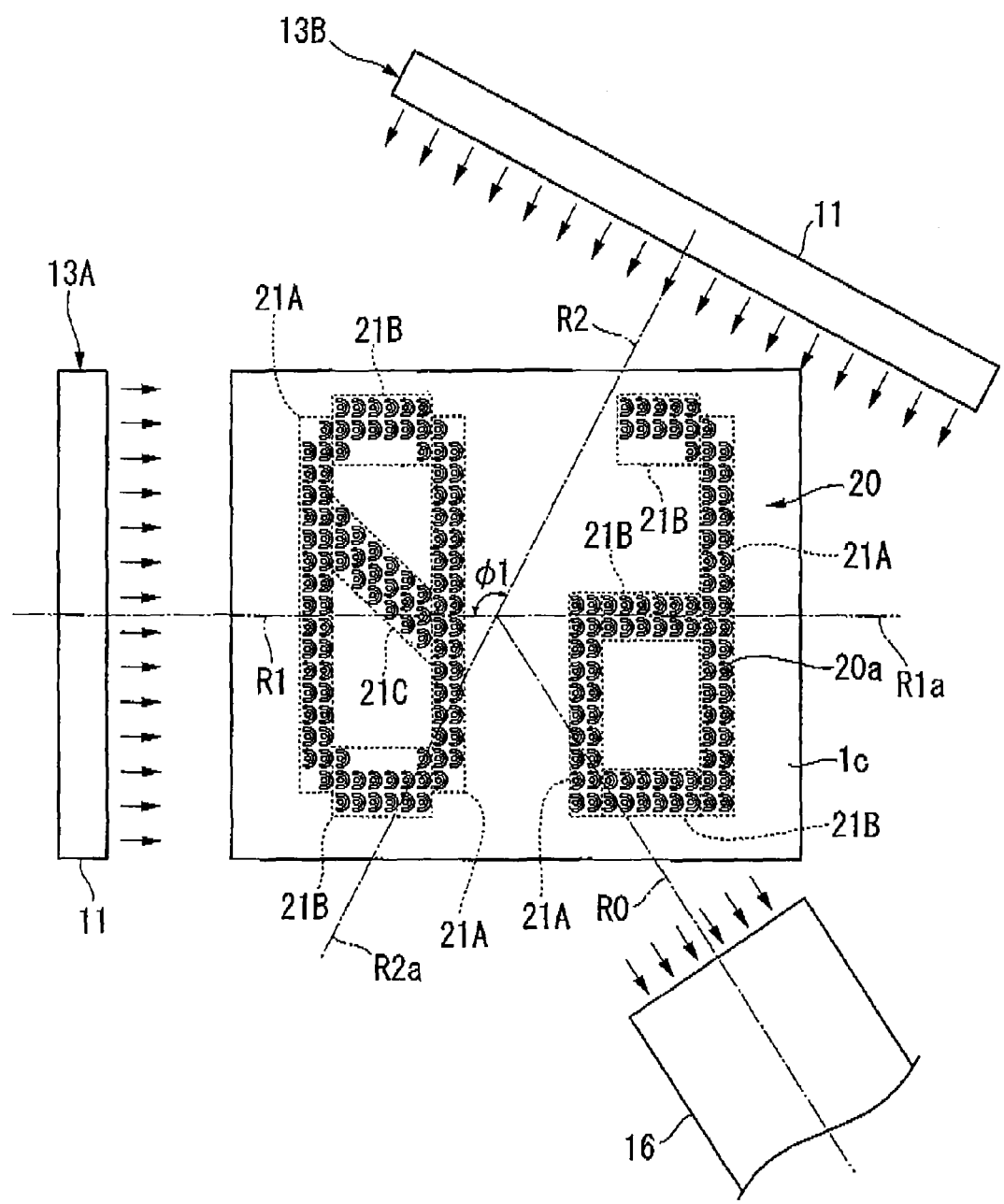
FIG. 3 is an illustration diagrammatically showing the positional relationship between two infrared units and the infrared camera included in the identification mark reading apparatus in view of the backside of the wafer.
Figure 4:
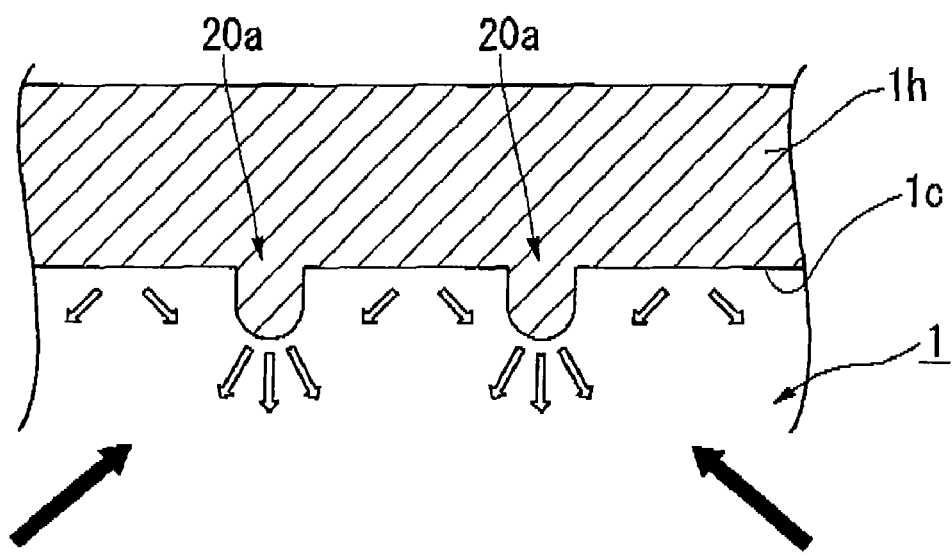
FIG. 4 is an illustration diagrammatically showing the relationship between infrared rays, which are irradiated onto the backside of the wafer whose identification mark is sealed with a resin layer on the surface, and reflected rays reflected by the identification mark.

An identification mark 20 (representing a lot number and a wafer number as shown in FIGS. 3, 4, and 7) is formed at a prescribed position of the external portion of the surface 1*c* opposite to the notch 1*a*. The identification mark 20 is constituted of multiple characters and numbers, for example. Each of the characters and numbers included in the identification mark 20 is formed by combining line segments 21A, 21B, and 21C, each of which is a thin recess having a length and a width. As shown in FIG. 3, each of the line segments 21A, 21B, and 21C is formed using small recesses (or dimples), i.e. dots 20*a*, which are aligned in prescribed directions.

In FIG. 3, the dots 20*a* are each aligned with a small distance therebetween; hence, the identification mark 20 is formed using small irregularities aligned on the surface 1*c* of the wafer 1. A laser marker is used to form the dots 20*a*, diameters of which may range between 20 μm to 500 μm, for example.

As shown in FIGS. 4 and 8, when the surface 1*c* of the wafer 1 is sealed with the resin layer 1*h*, the dots 20*a* forming the identification mark 20 are each filled with the resin layer 1*h*; hence, the identification mark 20 is completely sealed with the resin layer 1*h*. In this state, it is impossible for a human operator to visually read the identification mark 20; in other words, it is impossible to optically read the identification mark 20 by means of a CCD camera, which may receive reflected rays caused by irradiating visible rays to the identification mark 20.

Figures 5, 6:
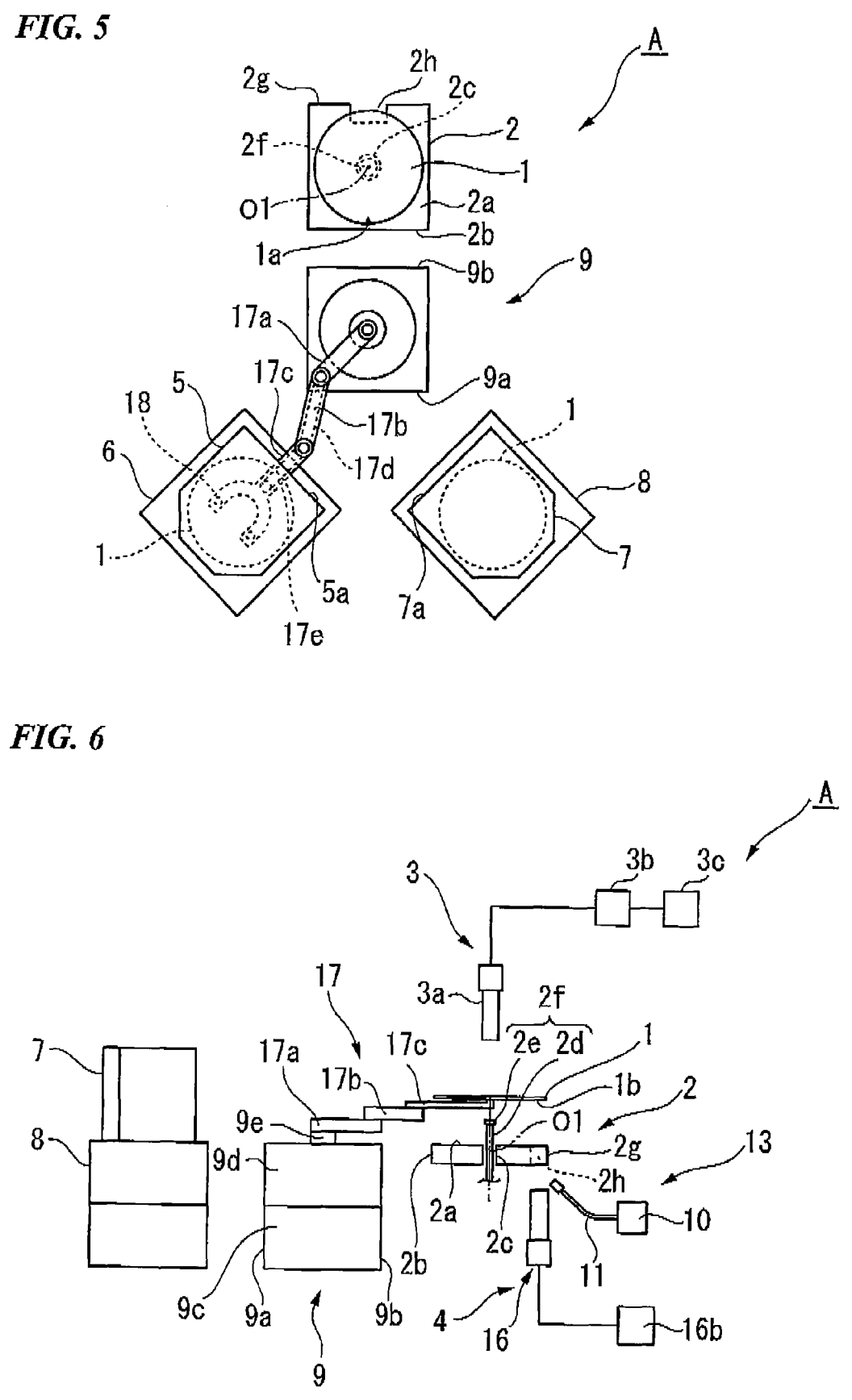

As shown in FIGS. 5 and 6, an identification mark reading apparatus A according to the first embodiment of the present invention is constituted of a stage 2 for mounting the wafer 1, a first image pickup device 3 (which is positioned above the stage 2 so as to pick up an exterior image of the wafer 1), a second image pickup device 4 (which is positioned below the stage 2 so as to read the identification mark 20 of the wafer 1), a first case 5 (for storing multiple wafers therein), a first case mount 6 (for mounting the first case 5), a second case 7 (which is capable of storing multiple wafers), a second case mount 8 (for mounting the second case 7), and a transport unit 9 (for transporting the wafer 1 between the first case 5, the second case 7, and the stage 2). The stage 2 is positioned opposite to the first case mount 6 and the second case mount 8 by way of the transport unit 9.

The stage 2 has a rectangular-disk-like shape in plan view, wherein an opening 2*c* running through the upper surface and lower surface thereof is formed approximately at the center thereof. An absorption unit 2*f* constituted of an absorption member 2*d* and an absorption pad 2*e* is retractably inserted into the opening 2*c* of the stage 2 about its axial line O1 in a rotatable manner. In the absorption unit 2*f*, the absorption pad 2*e* for absorbing and holding the wafer 1 is attached to the distal end of the absorption member 2*d* having a cylindrical shape. The internal hole of the absorption member 2*d* is connected to a vacuum suction device such as a vacuum pump. When the vacuum suction device is operated while the absorption pad 2*e* is brought into contact with a backside 1*b* of the wafer 1, the absorption pad 2*e* functions as a sucker. That is, the absorption unit 2*f* absorbs and holds the wafer 1, rotates it about the axial line O1, and moves it along the axial line O1.

A recess 2*h* is formed in a second side 2*g* opposite to a first side 2*b* of the stage 2 positioned opposite to the transport unit 9. The recess 2*h* is recessed perpendicular to the second side 2*g*. A prescribed part of the external portion of the wafer 1, mounted on a surface 2*a* of the stage 2, is positioned to overlap the recess 2*h* of the stage 2.

The wafer 1 is mounted on the stage 2 such that the backside 1*b* thereof is directly mounted on the surface 2*a* of the stage 2.

As shown in FIG. 6, the first image pickup device 3 is constituted of an image pickup 3*a* such as a CCD camera and a wafer position detector 3*b* (connected to the image pickup 3*a*). The image pickup 3*a* is positioned such that the optical axis thereof is substantially perpendicular to the surface 2*a* of the stage 2. The wafer position detector 3*b* detects the external portion of the wafer 1 or the notch 1*a* (which is cut out in the external portion of the wafer 1, see FIG. 5) based on an image signal output from the image pickup 3*a*, thus specifying the position of the wafer 1. The wafer position detector 3*b* is further connected to a display 3*c* such as a monitor, which displays the image of the wafer 1 picked up by the image pickup 3*a*.

Figure 1:
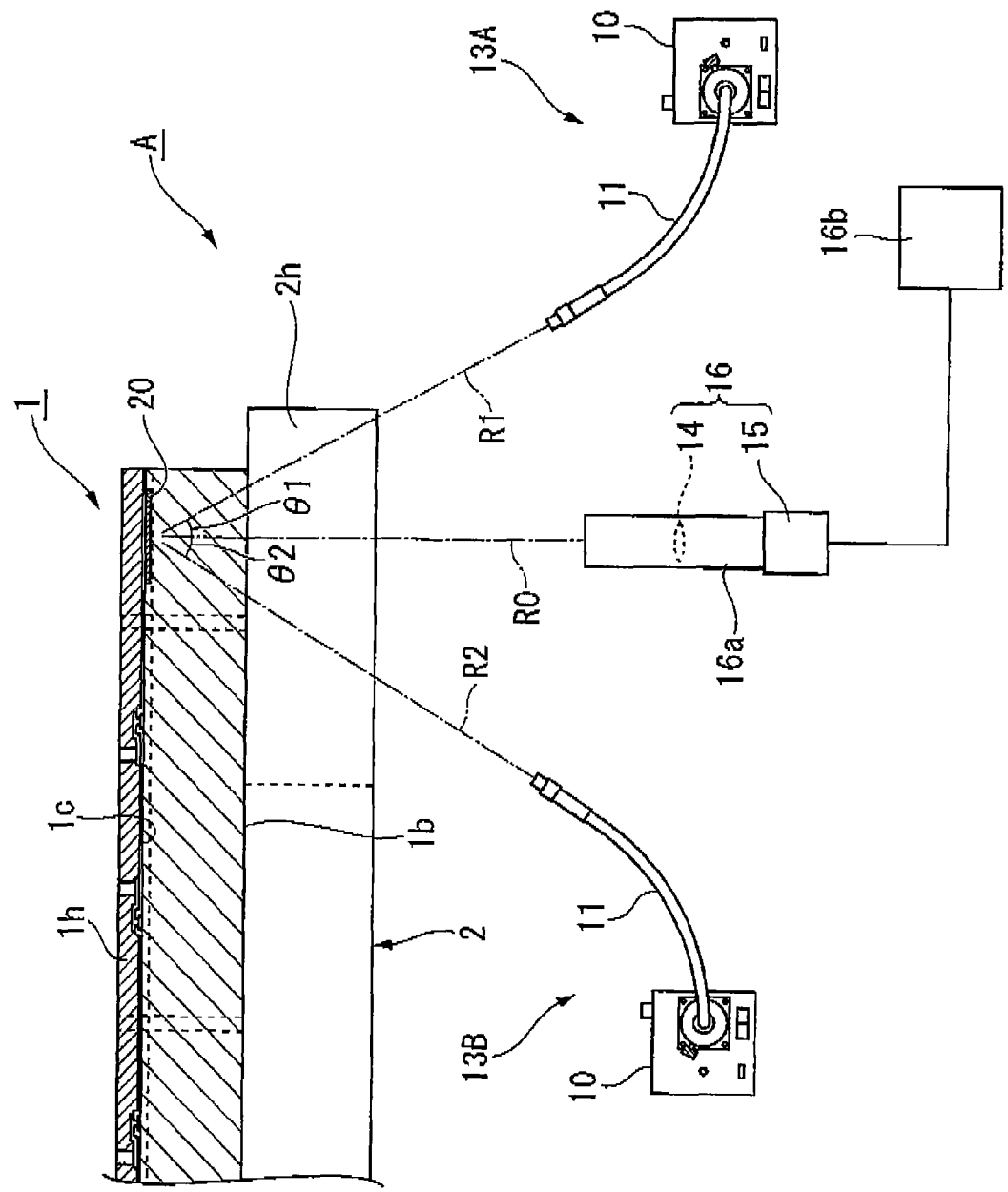
FIG. 1 is an illustration diagrammatically showing the positional relationship between two infrared units and an infrared camera, which are included in an identification mark reading apparatus for reading an identification mark formed on a surface of a wafer in accordance with a first embodiment of the present invention.
Figure 2:
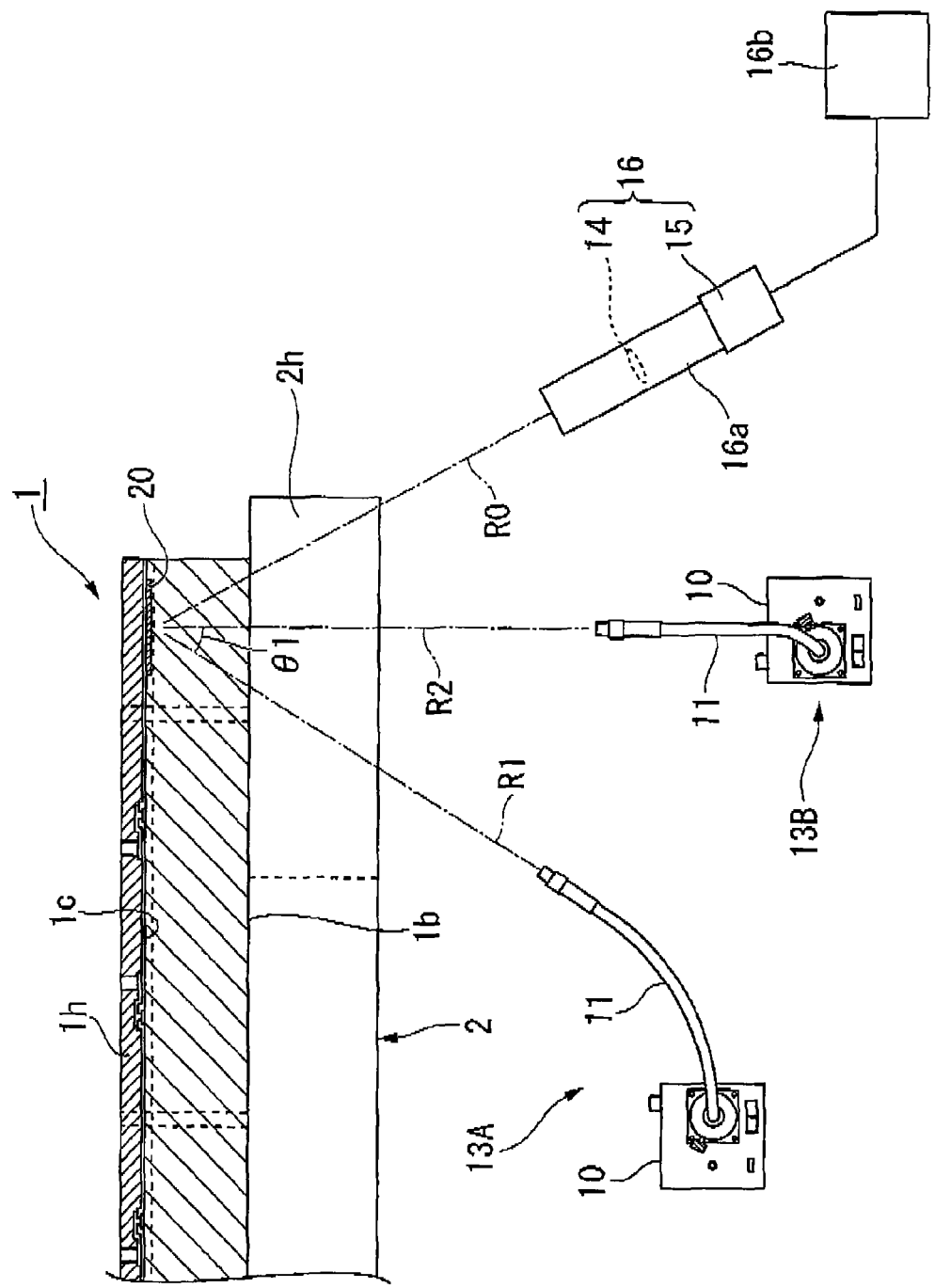
FIG. 2 is an illustration diagrammatically showing the positional relationship between two infrared units and the infrared camera included in the identification mark reading apparatus in view of a prescribed side of the wafer.

As shown in FIGS. 1, 2, and 6, the second image pickup device 4 is constituted using two infrared units 13A and 13B (collectively referred to as an infrared unit 13 in FIG. 6), which irradiate infrared rays towards the surface 1*c* of the wafer 1, and infrared camera (i.e. an IR camera or an image pickup) 16 for receiving infrared rays.

Each of the infrared units 13A and 13B is constituted of an infrared source (or an IR source) 10 for outputting infrared rays (having prescribed wavelengths achieving transmission through the wafer 1) and a fiber bundle 11 for defining an optical path of infrared rays output from the infrared source 10. The infrared source 10 is stored in a housing having a rectangular box-like shape (not shown). In the present embodiment, the infrared source 10 for outputting infrared rays having the same wavelength is applied to both of the infrared units 13A and 13B.

The first end of the fiber bundle 11 is arranged inside of the housing so as to receive infrared rays output from the infrared source 10, while the second end of the fiber bundle 11 is extended outside of the housing. The fiber bundle 11 guides infrared rays (received at the first end thereof) to the second end thereof, from which infrared rays are irradiated in a prescribed direction (i.e., along optical axes R1 and R2 shown in FIG. 1).

The fiber bundle 11 has a flexible structure allowing the second end thereof to be freely changed in position and direction relative to the first end thereof. This makes it possible to freely change the optical axes R1 and R2 (for irradiating infrared rays) in directions.

In the present embodiment, the second ends of the fiber bundles 11 included in the infrared units 13A and 13B are each directed towards the recess 2*h* of the stage 2 so that the optical axes R1 and R2 (for irradiating infrared rays from the second ends of the fiber bundles 11) run towards the backside 1b of the wafer 1 mounted on the stage 2 via the recess 2h. Since infrared rays transmit through the wafer 1, they actually transmit through the backside 1b so as to reach the surface 1c corresponding to the interface of the resin layer 1h. The wafer 1 may absorb infrared rays whose wavelengths range between 1100 nm and 9000 nm. Therefore, it is preferable that the wavelengths of infrared rays output from the infrared source 10 range between 1100 nm and 8000 nm, and it is more preferable that they range between 1500 nm and 5000 nm.

The optical axes R1 and R2 of the infrared units 13A and 13B are each inclined by an acute angle with respect to the surface 1c of the wafer 1. Specifically, it is preferable that incidence angles θ1 and θ2 of the optical axes R1 and R2 of the infrared units 13A and 13B (i.e. angles formed between the optical axes R1 and R2 and the perpendicular of the surface 1c of the wafer 1) range between 5° and 45°, more preferably, they range between 10° and 30°, desirably, they are set to 15°. Both the incidence angles θ1 and θ2 adapted to the infrared rays 13A and 13B can be set to the same angle relative to the perpendicular of the surface 1c of the wafer, whereas it may be preferable that they differ from each other.

As shown in FIG. 3, the optical axes R1 and R2 of the infrared units 13A and 13B intersect each other at an obtuse angle or a right angle within a prescribed plane lying along the surface 1c of the wafer 1. Specifically, it is preferable that an inter-axial angle φ1 between the optical axes R1 and R2 of the infrared units 13A and 13B, which intersect each other within the plane lying along the surface 1c of the wafer 1, ranges between 90° and 170°, more preferably ranges between 120° and 160°, and even more preferably set to 150°. That is, it is preferable that the optical axes R1 and R2 of the infrared units 13A and 13B intersect each other at an obtuse angle therebetween within the plane lying along the surface 1c of the wafer 1.

In FIG. 3, reference symbol "R1a" designates an optical axis of reflected rays corresponding to infrared rays output from the infrared unit 13A which are subjected to regular reflection at the interface between the resin layer 1h and the surface 1c of the wafer 1. Reference symbol "R2a" designates an optical axis of reflected rays corresponding to infrared rays output from the infrared unit 13B which are subjected to regular reflection at the interface between the resin layer 1h and the surface 1c of the wafer 1.

The infrared camera 16 is constituted of a lens 14 and an image pickup 15 incorporated in a cylindrical housing 16a, wherein the image pickup 15 is positioned below the lens 14. That is, the lens 14 and the image pickup 15 are aligned along an optical axis R0 of the optical system of the infrared camera 16. Hence, infrared rays may enter into the cylindrical housing 16a along the optical axis R0 so as to reach the image pickup 15 via the lens 14. A line connected to the image pickup 15 is extended from the lower end of the cylindrical housing 16 and is thus connected to a display 16b such as a monitor.

The optical axis R0 of the infrared camera 16 extends towards the backside 1b of the wafer 1 mounted on the stage 2 via the recess 2h. As shown in FIG. 2, the optical axis R0 of the infrared camera 16 crosses the surface 1c of the wafer 1 at an acute angle, which differs from the angles θ1 and θ2 of the optical axes R1 and R2 of the infrared units 13A and 13B. As shown in FIG. 3, the optical axis R0 of the infrared camera 16 crosses the optical axes R1 and R2 of the infrared units 13A and 13B at obtuse angles therebetween within the plane lying along the surface 1c of the wafer 1. In addition, the optical axis R0 of the infrared camera 16 is positioned between the optical axes R1a and R2a of reflected rays corresponding to infrared rays output from the infrared units 13A and 13B subjected to regular reflection. That is, the infrared camera 16 is positioned opposite to the infrared units 13A and 13B so as to prevent the image pickup 15 from receiving reflected rays corresponding to infrared rays output from the infrared units 13A and 13B subjected to regular reflection.

As shown in FIGS. 5 and 6, the first case 5 having a rectangular-box-like shape is mounted on a surface 6a of the first case mount 6, wherein one side Sa thereof is opened and directed towards the transport unit 9. Similar to the first case 5, the second case 7 having a rectangular-box-like shape is mounted on a surface 8a of the second case mount 8, wherein one side 7a thereof is opened and directed towards the transport unit 9.

Each of the first case 5 and the second case 7 has multiple slots for storing respective wafers, so that each of them stores a single lot of multiple wafers that are regularly aligned.

Each of the first case mount 6 and the second case mount 8 is equipped with a driver (not shown) for raising and lowering each of the first case 5 and the second case 7. A controller (not shown) controls the driver so as to raise and lower each signal slot of wafers (stored in the first case 5 and the second case 7).

The transport unit 9 is constituted of an X-Y table 9c, a rotary actuator 9d (vertically mounted on the X-Y table 9c) having a rotation shaft 9e, and a multi-articulation arm 17 (interconnected to the upper end of the rotation shaft 9e of the rotary actuator 9d.

The multi-articulation arm 17 is constituted of a first arm 17a, a second arm 17b, and a third arm 17c, which are horizontally arranged in parallel with each other. A first end of the first arm 17a is interconnected to the upper end of the rotation shaft 9e so that the first arm 17a moves to follow up the rotation of the rotation shaft 9e. A first end of the second arm 17b is axially supported by a second end of the first arm 17a in a free rotation manner, wherein the second arm 17b can rotate about the second end of the first arm 17a by means of a belt drive 17d incorporated in the second arm 17b. A first end of the third arm 17c is axially supported by a second end of the second arm 17b in a free rotation manner, wherein the third arm 17c can rotate about the second end of the second arm 17b by means of a belt drive 17e incorporated in the third arm 17c. A second end of the third arm 17c has a forked shape having two branches, wherein projected supports 18 are attached to the upper ends of the two branches. Vacuum suction inlets (not shown) are formed in the projected supports 18 so as to communicate with a suction path (not shown) formed inside of the third arm 17c. The suction path is connected to a vacuum suction device such as a vacuum pump (not shown).

Next, a method for reading the identification mark 20 formed on the surface of the wafer 1 will be described in connection with the identification mark reading apparatus A.

First, the first case 5 storing multiple wafers is mounted on the first case mount 6, while the second case 7 storing no wafer is mounted on the second case mount 8. Next, the transport unit 9 is driven so as to insert the distal ends of the forked portion (i.e. the second end) of the third arm 17c into the first case 5, wherein the projected supports 18 are brought into contact with the backside 1b of the wafer 1, which is selectively subjected to transport, so that the wafer 1 is absorbed and held by the projected supports 18.

The wafer 1 held by the third arm 17c is extracted from the first case 5 and is then transported onto the stage 2. Next, the absorption unit 2f is moved upwardly and above the opening 2c of the stage 2 so that the absorption pad 2e is brought into contact with approximately the center of the wafer 1 held by the third arm 17c; then, the vacuum suction device interconnected to the absorption member 2d is driven so as to absorb and hold the wafer 1. Thereafter, absorption forces of the projected supports 18 of the third arm 17c are released; then, the transport unit 9 is returned to the original position. As described above, the wafer 1 is extracted from the first case 5 and is then transported to the stage 2.

The position of the identification mark 20 is not initially recognized in the wafer 1 held by the absorption unit 2f. For this reason, the first image pickup device 3 picks up an exterior image of the wafer 1 showing the external portion of the wafer 1 and the position of the notch 1a, based on which the wafer position detector 3b detects the present position of the wafer 1. After detection of the present position of the wafer 1, the absorption unit 2f is rotated about the axial line O1 so as to move the wafer 1 such that the notch 1a is set to the prescribed position. Then, the absorption force of the absorption pad 2e is released, while the absorption unit 2f is retracted below the surface 2a of the stage 2, thus precisely mounting the wafer 1 on the surface 2a of the stage 2. Thus, it is possible to precisely locate the identification mark 20 of the wafer 1 in connection with the recess 2h of the stage 2.

Next, the identification mark 20 of the wafer 1 mounted on the stage 2 is read by means of the second image pickup device 4.

Specifically, as shown in FIGS. 1 to 4, infrared rays output from the infrared sources 10 of the infrared units 13A and 13B are transmitted via the fiber bundles 11 and are then irradiated to the backside 1b of the wafer 1 via the recess 2h of the stage 2.

Since wavelengths of infrared rays irradiated onto the backside 1b of the wafer 1 range from 1100 nm to 8000 nm, they are transmitted through the wafer 1. Most of transmitted infrared rays are not absorbed by and transmitted through the resin layer 1h of the wafer 1 due to the aforementioned range of wavelengths; hence, they may reflected on the interface between the resin layer 1h and the surface 1c of the wafer 1.

Reflected infrared rays (or reflected rays) are transmitted through the wafer 1 again and propagate outside of the wafer 1; hence, they are received by the lens 14 of the infrared camera 16, converged and then picked up by the image pickup 15. Thus, it is possible to pick up the image of the identification mark 20 formed on the surface 1c of the wafer 1, wherein an image signal output from the image pickup 15 is supplied to the display 16b via the connection line, thus displaying the image on the display 16b. By visually recognizing the displayed image, it is possible to read the identification mark 20 of the wafer 1 sealed with the resin layer 1h.

In the present embodiment, the entirely planar area is formed in the surface 1c of the wafer 1 except for the identification mark 20 and the surrounding area thereof (referred to as an identification mark forming region); hence, as shown in FIG. 4, infrared rays output from the infrared units 13A and 13B are regularly reflected on the main surface 1c of the wafer 1, while irregularities (e.g., micro projections and recesses) are formed in the identification mark forming region, at which infrared rays are irregularly reflected.

The optical axis R0 is determined such that the infrared camera 16 does not directly and regularly receives reflected rays corresponding to infrared rays of the infrared units 13A and 133B regularly reflected on the surface 1c of the wafer 1. Within irregularly reflected rays, which are irregularly reflected on the identification mark forming region, the infrared camera 16 receives only a part of the irregularly reflected rays (which propagate in a prescribed direction along the optical axis R0). That is, the amount of reflected rays received by the infrared camera 16 depends upon the amount of irregularly reflected rays, which propagate in the prescribed direction along the optical axis R0, within the total amount of infrared rays output from the infrared units 13A and 13B.

As described above, the infrared camera 16 picks up an image of the identification mark 20. After completion of the image pickup process, the wafer 1 is brought into contact with the absorption pad 2e of the absorption unit 2f and is then absorbed and held again, so that the wafer 1 is passed to the transport unit 9. Then, the wafer 1 is transported by the transport unit 9 and is then stored in a prescribed slot of the second case 7 mounted on the second case mount 8. At this time, the wafer 1 is stored in the prescribed slot, which is designated by the identification mark 20 read by the identification mark reading apparatus A. The aforementioned operations are repeatedly performed with respect to multiple wafers stored in the first case 5; thus, multiple wafers are stored in the corresponding slots of the second case 7 in such a way that they are aligned and sorted in an ascending order or a descending order of numbers indicated by their identification marks.

The identification mark reading apparatus A is equipped with the infrared units 13A and 13B, which irradiate infrared rays towards the wafer 1 so that infrared rays transmit through the wafer 1 and are then reflected at the interface between the resin layer 1h and the surface 1c of the wafer 1. It is also equipped with the infrared camera 16, which is capable of receiving reflected rays so as to pick up an image. This makes it possible to pick up the image of the identification mark 20 (formed on the surface 1c) by irradiating infrared rays towards the backside 1b of the wafer 1. That is, the present embodiment can specify the lot of the wafer 1 by reading the identification mark 20 formed on the surface 1c of the wafer 1 sealed with a resin.

The optical axis R0 is arranged such that the infrared camera 16 does not receive regularly reflected rays corresponding to infrared rays output from the infrared units 13A and 13B and regularly reflected on the surface 1c. This prevents the infrared camera 16 from picking up an image of the planar surface 1c except for the identification mark forming region; hence, it is possible to precisely pick up only an image of the identification mark 20 with ease. In other words, it is possible to improve the contrast between the identification mark forming region and the planar surface 1c of the wafer 1.

The optical axis R0 of the infrared camera 16 crosses the optical axes R1 and R2 of the infrared units 13A and 13B with obtuse angles therebetween in the plane lying along the surface 1c of the wafer 1, wherein the optical axis R0 lies between the optical axes R1a and R2a for propagating regularly reflected rays corresponding to infrared rays of the infrared units 13A and 13B regularly reflected on the surface 1c of the wafer 1. This makes it possible to clearly and brightly displaying an image of the identification mark 20 while preventing the infrared camera 16 from receiving regularly reflected rays.

The optical axes R1 and R2 of the infrared units 13A and 13B are inclined with acute angles compared with the perpendicular of the surface 1c of the wafer 1. This increases the amount of irregularly reflected rays (irregularly reflected at the identification mark forming region). In addition, the optical axis R0 of the infrared camera 16 is inclined with an acute angle compared with the perpendicular of the surface 1c of the wafer 1; hence, the infrared camera 16 can intensely receive irregularly reflected rays. Thus, it is possible to pick up the image of the identification mark 20 more clearly and brightly.

When the incidence angles θ1 and θ2, by which infrared rays of the infrared units 13A and 13B are incident on the surface 1c of the wafer 1, differ from each other, it is possible for the infrared camera 16 to receive irregularly reflected rays (reflected at the identification mark forming region) having a high level of brightness.

Since the optical axes R1 and R2 of the infrared units 13A and 13B intersect at an obtuse angle therebetween in the plane lying along the surface 1c of the wafer 1, it is possible to easily read the identification mark 20 constituted of the thin line segments 21A, 21B, and 21C having lengths and widths.

In the plane lying along the surface 1c of the wafer 1 shown in FIG. 3, when the length of the line segment 21B lies in parallel with the optical axis R1 of the infrared unit 13A, and when the length of the line segment 21C is inclined with a small inclination angle (e.g. 45° or less) relative to the optical axis R1 of the infrared unit 13A, a relatively large number of dots (within all dots included in the line segments 21B and 21C) are not irradiated by infrared rays of the infrared unit 13A. For this reason, a part of images regarding the line segments 21B and 21C is not picked up by use of only the infrared unit 13A; that is, the apparatus A may suffer from an inadequate image pickup with respect to the line segments 21B and 21C.

Since the optical axis R2 of the infrared unit 13B intersects the optical axis R1 of the infrared unit 13A at an obtuse angle in the plane lying along the surface 1c of the wafer 1, the length of the line segment 21B intersects the optical axis R2 of the infrared unit 13B at an obtuse angle, wherein the length of the line segment 21C is inclined with a large inclination angle (e.g. 45° or more) relative to the optical axis R2 of the infrared unit 13B. This reduces the number of dots in the line segments 21B and 21C not irradiated by infrared rays; hence, it is possible to clearly pick up images of the line segments 21B and 21C.

In the present embodiment, the optical axis R0 of the infrared camera 16 intersects at an acute angle compared with the perpendicular of the surface 1c of the wafer 1; but this is not a restriction. That is, the infrared camera 16 can be rearranged such that the optical axis R0 intersects the surface 1c of the wafer 1 at a right angle.

In the plane lying along the surface 1c of the wafer 1, the optical axis R0 of the infrared camera 16 intersects the optical axes R1 and R2 of the infrared units 13A and 13B at obtuse angles, and the optical axis R0 of the infrared camera 16 lies between the optical axes R1a and R2a for propagating regularly reflected rays corresponding to infrared rays of the infrared units 13A and 13B regularly reflected on the surface 1c of the wafer 1; but this is not a restriction. That is, the optical axis R0 of the infrared camera 16 can be laid at any position. For example, the optical axis R0 of the infrared camera 16 intersects one of the optical axes R1 and R2 of the infrared units 13A and 13B at a right angle or an acute angle in the plane lying along the surface 1c of the wafer 1. Alternatively, the optical axis R0 crosses the optical axes R1 and R2 at right angles or acute angles.

In the above, it is possible to clearly and brightly pick up an image of the identification mark 20 formed in the identification mark forming region compared with the planar surface 1c of the wafer 1. Even when the infrared camera 16 is positioned to receive regularly reflected rays corresponding to infrared rays of the infrared unit 13A regularly reflected on the surface 1c, the infrared camera 16 also receives irregularly reflected rays corresponding to infrared rays of the infrared unit 13B irregularly reflected at the identification mark 20. That is, the infrared camera 16 can receive a relatively large amount of reflected rays corresponding to the sum of regularly reflected rays (produced by the infrared unit 13A) and irregularly reflected rays (produced by the infrared unit 13B), thus clearly picking up the image of the identification mark 20. In contrast, the infrared camera 16 receives a relatively small amount of reflected rays corresponding to only regularly reflected rays corresponding to infrared rays of the infrared camera 13A regularly reflected on the planar surface 1c of the wafer 1 except for the identification mark forming region.

It is preferable that the image pickup 15 of the infrared camera 16 be located at a prescribed position at which the infrared camera 16 does not receive regularly reflected rays (produced by the infrared units 13A and 13B). It is preferable that the optical axis R0 of the infrared camera 16 intersects the optical axes R1 and R2 of the infrared units 13A and 13B at right angles or obtuse angles in the plane lying along the surface 1c of the wafer 1.

In the present embodiment in which the optical axes R1 and R2 of the infrared units 13A and 13B intersect each other at an obtuse angle in the plane lying along the surface 1c of the wafer 1, it is possible to increase an inter-axis angle between the optical axes R1 and R2; hence, it is possible to easily arrange the optical axis R0 of the infrared camera 16 within a broad range of the inter-axis angle.

The present embodiment is designed such that both the optical axes R1 and R2 of the infrared units 13A and 13B are inclined at acute angles compared with the perpendicular of the surface 1c of the wafer 1, and intersect each other at an obtuse angle in the plane lying along the surface 1c of the wafer 1; but this is not a restriction. That is, the present embodiment requires that the optical axes R1 and R2 extend to intersect the surface 1c of the wafer 1 in different directions.

That is, one of the optical axes R1 and R2 of the infrared units 13A and 13B is inclined at an acute angle compared with the perpendicular of the surface 1c of the wafer 1, while the other is inclined at a right angle with the surface 1c of the wafer 1, for example. In addition, the optical axes R1 and R2 of the infrared units 13A and 13B intersect at a right angle or an acute angle in the plane lying along the surface 1c of the wafer 1, for example.

As long as the incidence angles θ1 and θ2 of the optical axes R1 and R2 of the infrared units 13A and 13B differ from each other in view of the surface 1c of the wafer 1, it is possible to set the inter-axis angle φ1 to either 0° or 180°. In other words, both the incidence angles θ1 and θ2 can be set to the same angle unless the inter-axis angle φ1 is set to either 0° or 180°.

The identification mark reading apparatus A of the present embodiment is equipped with the two infrared units 13A and 13B; but it is possible to arrange three or more infrared units. In this case, at least one inter-axis angle between two infrared units must be set to an obtuse angle or a right angle, wherein inter-axis angles between another infrared unit and these two infrared units can each be set to an acute angle or 0°. Alternatively, inter-axis angles between three infrared units can each be set to an obtuse angle.

Multiple infrared units do not necessarily output infrared rays of the same wavelength. That is, they can output infrared rays of different wavelengths within the aforementioned range.

In the present embodiment in which the second image pickup device 4 is constituted using the infrared units 13A and 13B, the optical axes R1 and R2 of the infrared units 13A and 13B are inclined in different directions with respect to the surface 1c of the wafer 1, wherein the infrared units 13A and 13B output respective infrared rays whose wavelengths differ from each other.

When the second image pickup device 4 is constituted using three or more infrared units, it is simply required that the wavelength of infrared rays output from one infrared unit differ from the wavelengths of infrared rays output from other infrared units, optical axes of which are inclined in different directions with respect to the surface 1c of the wafer 1.

Figure 9:
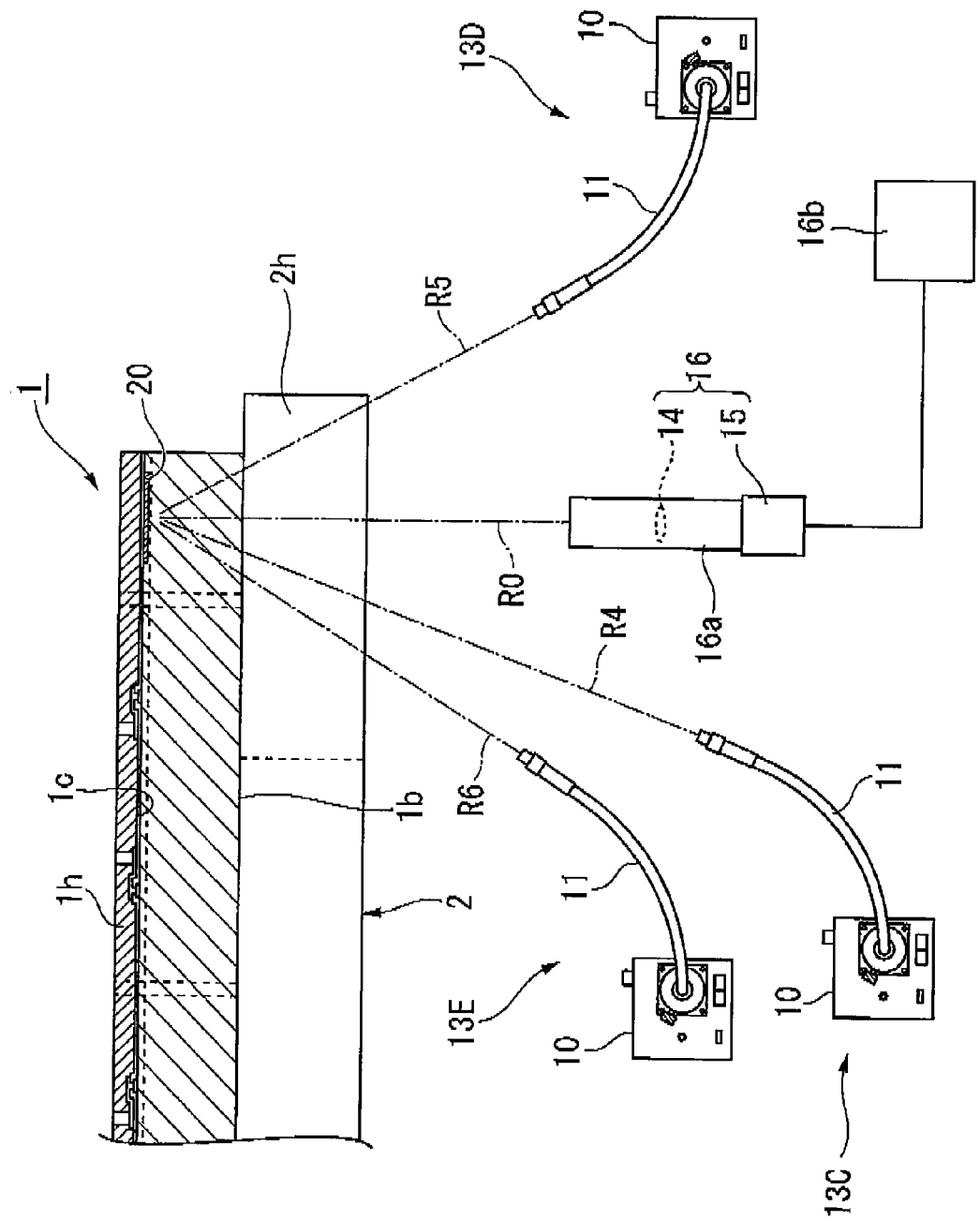
FIG. 9 is an illustration showing a modified example of the identification mark reading apparatus including three infrared units and an infrared camera.

FIG. 9 shows a modified example of an identification mark reading apparatus, in which parts identical to those shown in FIG. 1 are designated with the same reference numerals. The identification mark reading apparatus of FIG. 9 is equipped with three infrared units 13C, 13D, and 13E having optical axes R4, R5, and R6, wherein the wavelength of infrared rays output from the infrared unit 13C differs from the wavelength (s) of infrared rays output from the infrared units 13D and 13E. Compared with the optical axes R5 and R6, the optical axis R4 is inclined in a different direction in view of the surface 1c of the wafer 1. Alternatively, the optical axis R4 can be inclined in the same direction as one of the optical axes R5 and R6 with respect to the surface 1c of the wafer 1.

In the above, multiple infrared rays having different wavelengths are irregularly reflected at the identification mark forming region in the interface between the resin layer 1h and the surface 1c of the wafer 1, wherein irregularly reflected rays mutually interfere with each other so that the amount of reflected rays increases. This makes it possible to pick up the image of the identification mark 20 further clearly and brightly.

In FIGS. 1 and 9, the infrared units 13A to 13E are individually equipped with the infrared sources 10; but this is not a restriction. That is, they can be connected to the same infrared source 10. In this case, the first ends of the fiber bundles 11 of the infrared units 13A to 13E are connected to the same infrared source 10.

In the present embodiment, the identification mark reading apparatus A is constituted of the stage 2, the first image pickup device 3, the second image pickup device 4, the first case mount 6, the second case mount 8, and the transport unit 9; but this is not a restriction. The present embodiment requires that the identification mark reading apparatus Abe equipped with at least the second image pickup device 4. That is, the second image pickup device 4 is installed in an exterior inspection device installed in manufacturing processes of semiconductor devices so as to perform an exterior inspection by use of stages, transport units, and mounts already installed therein, wherein the identification mark 20 of the wafer 1 is read during the exterior inspection.

The first image pickup device 3 is not necessarily used to specify the position of the wafer 1. Instead, the first image pickup device 3 picks up an image for use in exterior inspection, or it can be used to read the identification mark 20 of the wafer 1 before formation of the resin layer 1h.

The stage 2 has the recess 2h allowing infrared rays of the infrared units 13A to 13E to transmit therethrough or allowing reflected rays to transmit therethrough; but this is not a restriction. For example, the stage 2 can be composed of a transparent material such as quartz glass capable of transmitting infrared rays therethrough.

In the above, the stage 2 does not need the recess 2h; hence, the angles of the optical axes R1, R2, and R4 to R6 of the infrared units 13A to 13E and the angles of the optical axis R0 of the optical system of the infrared camera 16 are not necessarily limited by the recess 2h. That is, it is possible to set the optical axes R1 to R6 in a relatively broad range of angles. In other words, it is possible to easily set the angles of the optical axes R1 to R6. Since the recess 2h is not formed in the stage 2, it is possible to read the identification mark 20, which is formed at any position on the surface 1c of the wafer 1.

The present embodiment is described under the precondition in which the wavelength of infrared rays output from the infrared source 10 ranges from 1100 nm to 8000 nm. However, the wavelength of infrared rays is not necessarily limited as long as it lies in ranges of infrared radiations (i.e., 700-2500 nm in near infrared radiation, 2500-4000 nm in intermediate infrared radiation, and 4000-600000 nm in far infrared radiation).

The wafer 1 is not necessarily composed of polycrystal or monocrystal silicon; that is, the material of the wafer 1 is not necessarily limited to silicon.

In the present embodiment, infrared rays of the infrared units 13A to 13E are irradiated to the wafer 1, in which dicing tapes are adhered to the backside 1b or individual pieces after dicing are held together via dicing tapes, wherein infrared rays transmit through dicing tapes so as to read the identification mark 20 formed on the surface 1c.

In the present embodiment, the diameters of dots forming the identification mark 20 (formed on the surface 1c of the wafer 1) range from 20 μm to 500 μm, whereas the identification mark reading apparatus A is capable of reading the identification mark 20 constituted of dots having very small diameters.

2. Second Embodiment

An identification mark reading apparatus B according to a second embodiment of the present invention will be described with reference to FIGS. 10 to 13, wherein parts identical to those shown in FIGS. 1 to 4 are designated by the same reference numerals.

The identification mark reading apparatus B reads the identification mark 20 formed on the surface 1c of the wafer 1 shown in FIGS. 7 and 8. The mechanical structure of the identification mark reading apparatus B is similar to that of the identification mark reading apparatus A shown in FIGS. 5 and 6; hence, the detailed description thereof is omitted. That is, the identification mark reading apparatus B of the second embodiment is basically constituted of the stage 2 for mounting the wafer 1, the first image pickup device 3 for picking up an image of the exterior of the wafer 1, the second image pickup device 4 for reading the identification mark 20 of the wafer 1, the first case 5, the first case mount 6, the second case 7, the second case mount 8, the transport unit 9 for transporting the wafer between the stage 2, the first case 5, and the second case 7.

Figure 10:
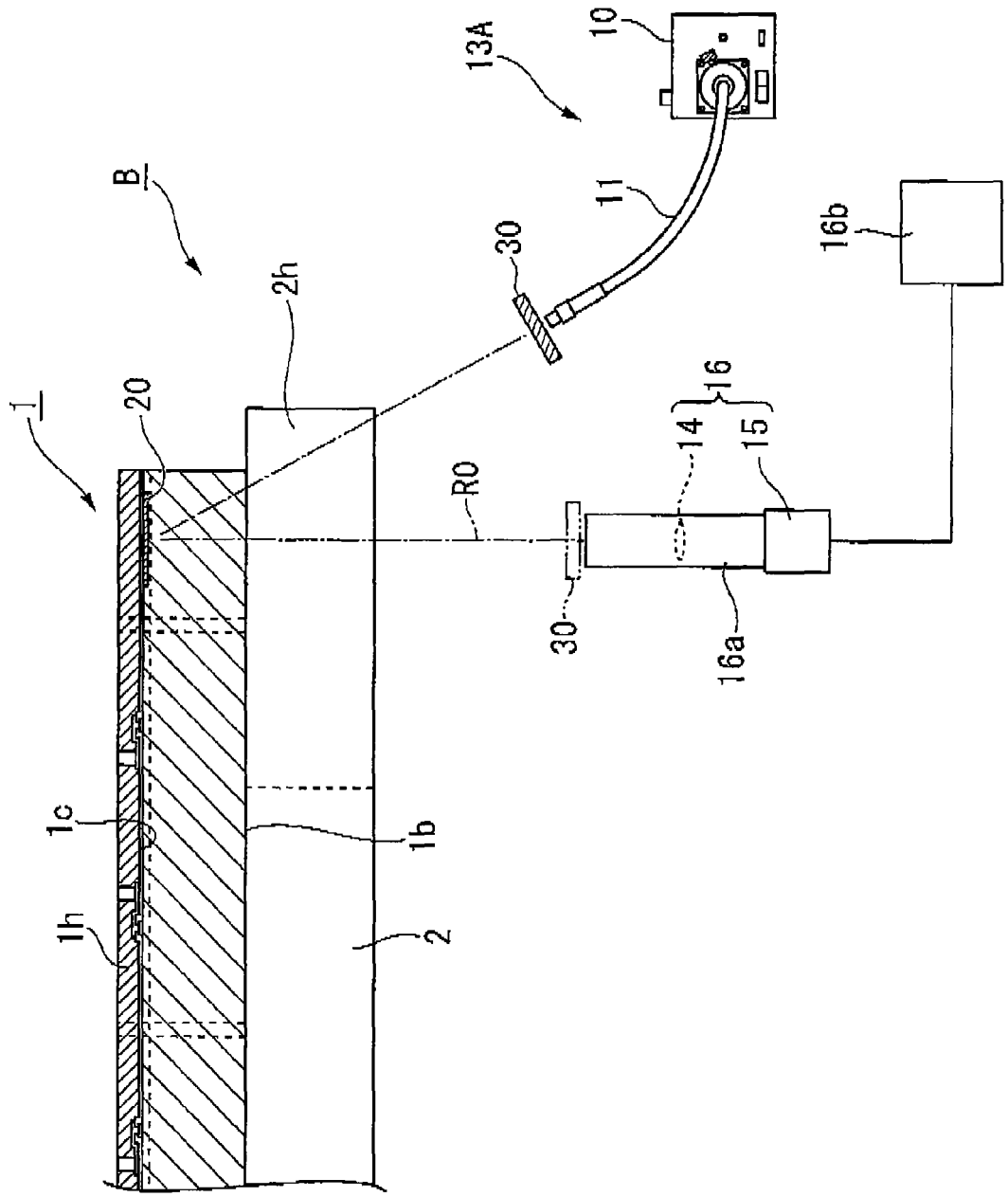
FIG. 10 is a diagram showing the positional relationship between an infrared unit and an infrared camera, which are included in an identification mark reading apparatus for reading an identification mark formed on a surface of a wafer in accordance with a second embodiment of the present invention.

As shown in FIGS. 10 and 6, the second image pickup device 4 is constituted of one infrared unit 13A (or 13 in FIG. 6) for irradiating infrared rays towards the surface 1c of the wafer 1 and the infrared camera 16 for receiving reflected rays so as to pick up an image of the identification mark 20.

The infrared unit 13A is constituted of the infrared source 10 for outputting infrared rays of a prescribed wavelength transmitting through the wafer 1 and a fiber bundle 11 for defining the optical path of infrared rays. The infrared unit 13A is held inside of a housing having a rectangular-box-like shape.

The identification mark reading apparatus B of the second embodiment is characterized by providing a polarizer 30 for limiting the transmission of infrared rays, wherein the polarizer 30 is positioned between the second end of the fiber bundle 11 and the wafer 1 mounted on the stage 2, specifically, it is positioned in proximity to the second end of the fiber bundle 11 in FIG. 10. Herein, the polarizer 30 is arranged perpendicular to the optical axis R1 for propagating infrared rays. The polarizer 30 transmits P polarizing components only within infrared rays while blocking other components.

The incidence angle of infrared rays relative to the surface 1c of the wafer 1 (i.e., the angle formed between the perpendicular of the surface 1c and the incidence rays) is set such that reflected rays (which enter into the backside 1b and are then reflected at the planar surface 1c except for the identification mark forming region) include a relatively small amount of P polarizing components but a relatively large amount of S polarizing components. For example, the incidence angle ranges from 50° to 85°, preferably ranging from 60° to 80°, and more preferably ranging from 65° to 75°.

The infrared camera 16 is constituted of the lens 14 and the image pickup 15 arranged inside of the cylindrical housing 16a. The lens 14 and the image pickup 15 are aligned in a prescribed direction along the optical axis R0 of the optical system of the infrared camera 16; hence, infrared rays propagating along the optical axis R0 enter into the housing 16a of the infrared camera 16, wherein they transmit through the lens 14 so as to reach the image pickup 15. In this connection, the line of the image pickup 15 is extended outside of the housing 16a and is then connected to a display 16b such as a monitor.

Next, a method for reading the identification mark 20 formed on the surface 1c of the wafer 1 will be described in connection with the identification mark reading apparatus B of the second embodiment. Similar to the foregoing method adapted to the identification mark reading apparatus of the first embodiment, the wafer 1 is extracted from the first case 5 and is then transported onto the surface 2a of the stage 2 by means of the transport unit 9, wherein the identification mark forming region of the wafer 1 vertically matches the recess 2h of the stage 2.

Next, the operation of the second image pickup device 4 for reading the identification mark 20 of the wafer 1 mounted on the stage 2 will be described with reference to FIGS. 10 and 11.

First, infrared rays output from the infrared source 10 of the infrared unit 13A transmitted through the fiber bundle 11 are irradiated towards the backside 1b of the wafer 1 via the recess 2h of the stage 2.

Since the wavelengths of infrared rays irradiated onto the backside 1b of the wafer 1 range from 1100 nm to 8000 nm, infrared rays transmit through the wafer 1, wherein a small amount of infrared rays are absorbed by the resin layer 1h so that a large amount of infrared rays are reflected on the interface between the resin layer 1h and the surface 1c of the wafer 1.

Reflected rays transmit through the wafer 1 so as to propagate outside of the wafer 1; hence, they are received and converged by the lens 14 of the infrared camera 16 so that the image pickup 15 forms an image based on received rays. Thus, it is possible to pick up the image of the identification mark 20 formed on the surface 1c of the wafer 1; then the image is displayed by the display 16b connected to the image pickup 15 via the line. By visually recognizing the displayed image, it is possible to read the identification mark 20 formed on the surface 1c of the wafer 1 sealed with the resin layer 1h.

The surface 1c of the wafer 1 except for the identification mark forming region forms a planar surface. Generally speaking, reflected rays reflected on the planar surface may include a relatively large amount of S polarizing components (which vibrate in parallel with the planar surface) and a relatively small amount of P polarizing components (which vibrate perpendicular to the planar surface). This tendency is enhanced when the incidence angle ranges from approximately 50° to 85°, preferably ranging from 60° to 80°, and more preferably ranging from 65° to 75°. In an incidence angle of this range, the reflection ratio of P polarizing components is minimized.

The identification mark reading apparatus B of the second embodiment is designed to appropriately set the incidence angle of the infrared rays output from the infrared unit 13A such that, within the reflected rays reflected at the planar surface 1c of the wafer 1 except for the identification mark forming region, the amount of P polarizing components is reduced but the amount of S polarized components is increased. That is, the incidence angle is set to increase the difference between the amount of P polarizing components and the amount of S polarizing components, wherein it ranges from 50° to 85°, preferably ranging from 60° to 80°, and more preferably ranging from 65° to 75°. In addition, the polarizer 30 allowing only P polarizing components to transmit therethrough is positioned in proximity to the second end of the fiber bundle 11, thus reducing the amount of P polarizing components within reflected rays with respect to the planar surface 1c of the wafer 1 except for the identification mark forming region. In particular, the amount of P polarizing components within reflected rays is reduced in the range of the incidence angle between 65° and 75°. Infrared rays are irregularly reflected in various directions at the identification mark forming region, wherein the reflection ratio may be increased with respect to a prescribed incidence angle (other than the aforementioned incidence angle increasing the difference between the amount of P polarizing components and the amount of S polarizing components) so that a relatively large amount of P polarizing components may appear in reflected rays. In FIG. 11, a thin arrow indicates infrared rays output from the infrared unit 13A, while bold arrows indicate P polarizing components, which transmit through the polarizer 30 and are then reflected at the surface 1c of the wafer 1.

Figure 11:
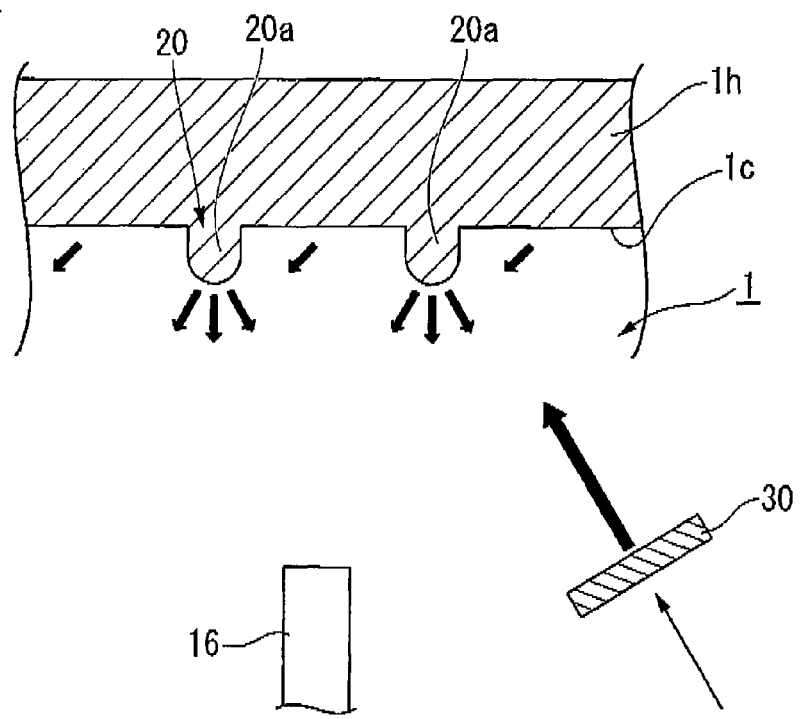
FIG. 11 is a diagram showing the relationship between infrared rays, which are irradiated onto the backside of the wafer via a polarizer, and reflected rays reflected by the surface and the identification mark in accordance with the second embodiment of the present invention.

The infrared camera 16 receives a mixture of first reflected rays, which are reflected at the planar surface 1c of the wafer 1 except for the identification mark forming region (i.e., the dots 20a included in the identification mark 20 in FIG. 11), and second reflected rays, which are reflected by the identification mark forming region. The first reflected rays may be extremely reduced; hence, the amount of second reflected rays becomes relatively large. That is, the infrared camera 16 receives a relatively large amount of second reflected rays (reflected at the identification mark forming region), thus precisely picking up the image of the identification mark 20 with a high S/N ratio. This enhances the image of the identification mark 20.

After completion of the image pickup operation regarding the identification mark 20, the wafer 1 is transported to the second case 7 by means of the transport unit 9. This operation is already described in conjunction with the first embodiment.

The aforementioned identification mark reading apparatus B is equipped with one infrared unit 13A, which irradiates infrared rays towards the surface 1c of the wafer 1 so that infrared rays transmit through the wafer 1 and are then reflected at the interface between the resin layer 1h and the surface 1c of the wafer 1. The infrared camera 16 receives reflected rays so as to produce an image. That is, it is possible to pick up the image regarding the surface 1c of the wafer 1 by irradiating infrared rays towards the surface 1c of the wafer 1 from its backside 1b; specifically, it is possible to read the identification mark 20 formed on the surface 1c of the wafer 1 sealed with the resin layer 1h, thus specifying the lot of the wafer 1 and the like.

The second embodiment is characterized in that only P polarizing components are irradiated onto the backside 1b of the wafer via the polarizer 30, wherein the incidence angle thereof is set such that the amount of first reflected rays (reflected at the planar surface 1c of the wafer 1 except for the identification mark forming region) is minimized while the amount of second reflected rays (reflected at the identification mark forming region) is relatively increased; hence, it is possible to easily pick up the image of the identification mark 20 with a high level of clearness and brightness. This makes it easy for the human operator to read the identification mark 20 formed on the surface 1c of the wafer 1.

In the second embodiment, the polarizer 30 allowing only P polarizing components to pass therethrough is arranged in proximity to the second end of the fiber bundle 11 of the infrared unit 13A; but this is not a restriction. That is, the polarizer 30 (indicated by dashed lines in FIG. 10) is arranged at a prescribed position between the wafer 1 mounted on the stage 2 and the infrared camera 16 (instead of the foregoing position proximate to the second end of the fiber bundle 11 of the infrared unit 13A), that is, it is arranged in proximity to the front end of the infrared camera 16. In this case, the incidence angle of infrared rays output from the infrared unit 13A is determined so as to increase the difference between P polarizing components and S polarizing components within reflected rays reflected at the planar surface 1c of the wafer 1 except for the identification mark forming region; that is, the incidence angle ranges from 50° to 85°, preferably ranging from 60° to 80°, and more preferably ranging from 65° to 75°.

Figure 12:
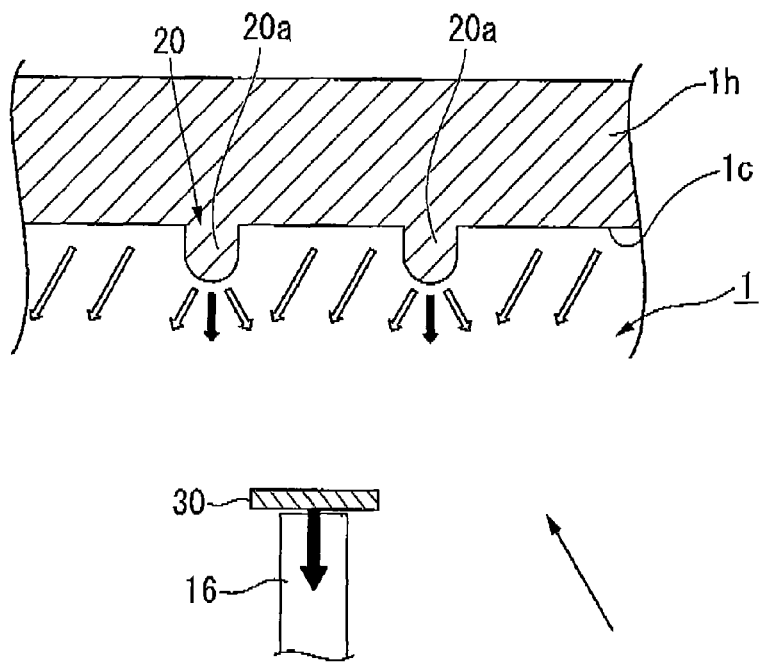
FIG. 12 is a diagram showing the relationship between infrared rays, which are irradiated onto the backside of the wafer, and reflected rays, which are reflected at the surface and the identification mark and are then received by the infrared camera via a polarizer.
Figure 13:
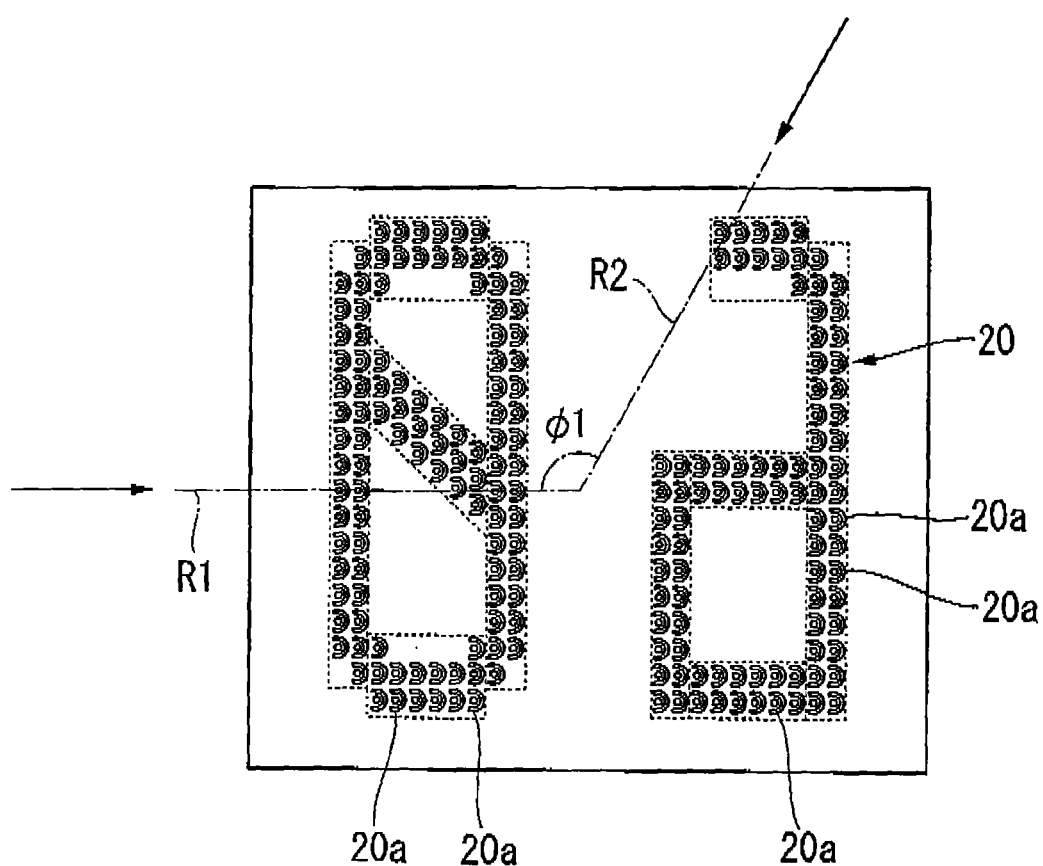
FIG. 13 is an enlarged plan view of the identification mark, which is formed on the surface of the wafer and is read using two infrared units and one infrared camera.

In the above, the infrared unit 13A irradiates infrared rays towards the backside 1b of the wafer 1 without intervention of polarization, so that infrared rays are reflected at the surface 1c of the wafer 1, as shown in FIG. 12, wherein reflected rays reflected at the surface 1c of the wafer 1 other than the identification mark forming region are enhanced in S polarizing components. In contrast, reflected rays reflected at the identification mark forming region are irregularly reflected in various directions; hence, they may be enhanced in directions other than the aforementioned incidence direction that increases the difference between P polarizing components and S polarizing components; in other words, they include a relatively large amount of P polarizing components. In FIG. 12, a solid arrow indicates infrared rays output from the infrared unit 13A; black arrows indicate reflected rays composed of P polarizing components (which are received by the infrared camera 16 via the polarizer 30); and white arrows indicate reflected rays composed of S polarizing components.

As described above, only P polarizing components of reflected rays transmit through the polarizer 30 and are then received by the infrared camera 16, wherein received rays of the infrared camera 16 include a relatively small amount of first reflected rays (reflected at the planar surface 1c of the wafer 1 except for the identification mark forming region) but a relatively large amount of second reflected rays (reflected at the identification mark forming region). The infrared camera 16 picks up the image of the identification mark 20 with a high S/N ratio; that is, it is possible to easily produce the image of the identification mark 20 with a high level of clearness and brightness; hence, it is possible for the human operator to easily read the identification mark 20.

When the polarizer 30 is arranged in proximity to the infrared unit 13A (see FIG. 11), it is possible to reduce reflection of the infrared rays at the planar surface 1c of the wafer 1 except for the identification mark forming region. When the polarizer 30 is arranged in proximity to the infrared camera 16 (see FIG. 12), reflection of infrared rays at the surface 1c of the wafer 1 may be enhanced, while received rays of the infrared camera 16 are reduced compared with reflected rays. In either case, it is possible to enhance the image of the identification mark 20 other than the image of the planar surface 1c of the wafer 1; that is, it is possible to clearly display the identification mark 20.

In the above, it is not necessary to set same polarization characteristics to the polarizer 30, which is positioned in proximity to the infrared unit 13A so as to reduce the reflection of infrared rays at the planar surface 1c of the wafer 1 except for the identification mark forming region, and the polarizer 30, which is positioned in proximity to the infrared camera 16 so as to reduce received rays compared with reflected rays reflected at the surface 1c of the wafer 1. That is, the polarizer 30 positioned in proximity to the infrared camera 16 can be determined in polarization characteristics so as to achieve a polarization direction that differs from the polarization direction of the reflected rays reflected at the planar surface 1c except for the identification mark forming region of the surface 1c, whereby the infrared camera 16 can selectively receive reflected rays from the identification mark 20.

The second embodiment can be further modified in a variety of ways; hence, variations of the second embodiment will be described with reference to FIGS. 13 to 17.

Figure 14:
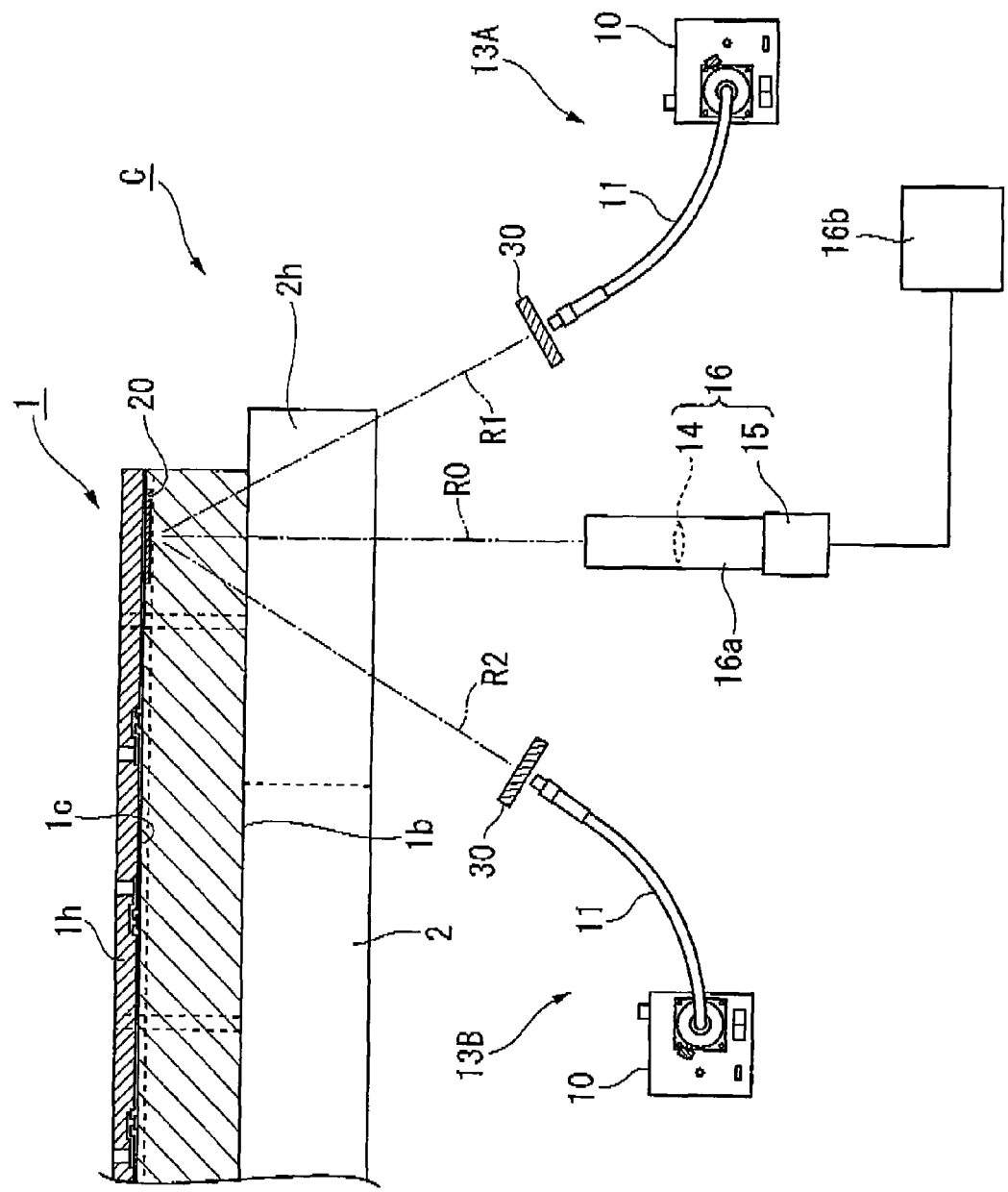
FIG. 14 is a diagram showing the positional relationship between two infrared units and one infrared camera, which are included in an identification mark reading apparatus according to a first variation of the second embodiment.

FIG. 14 shows a first variation of the second embodiment, i.e. an identification mark reading apparatus C equipped with two infrared units 13A and 13B in connection with the infrared camera 16, wherein each of the infrared units 13A and 13B can be equipped with the polarizer 30, or the infrared camera 16 can be equipped with the polarizer 30; alternatively, all the infrared units 13A and 13B and the infrared camera 16 can each be equipped with the polarizer 30.

Similar to the first embodiment (see FIGS. 1 and 3), the optical axes R1 and R2 of the infrared units 13A and 13B intersect each other at a right angle or an obtuse angle in the plane lying along the surface 1c of the wafer 1. Specifically, the inter-axis angle φ1 between the optical axes R1 and R2 of the infrared units 13A and 13B, which intersects in the plane lying across the surface 1c of the wafer 1, ranges from 90° to 170°, preferably ranging from 120° to 160°, and more preferably set to 150°. That is, it is preferable that the optical axes R1 and R2 of the infrared units 13A and 13B intersect each other at an obtuse angle in the plane lying along the surface 1c of the wafer 1. The infrared camera 16 should be positioned to not receive regularly reflected rays corresponding to infrared rays of the infrared units 13A and 13B regularly reflected at the surface 1c of the wafer 1. For example, the optical axis R0 of the infrared camera 16 is positioned perpendicular to the surface 1c of the wafer 1.

In the identification mark reading apparatus C, the infrared units 13A and 13B irradiate infrared rays in different angles towards the backside 1b of the wafer 1; hence, it is possible to easily recognize linear portions of the identification mark 20 constituted of thin line segments.

When the optical axis of one infrared unit substantially matches the longitudinal direction of the linear portion of the identification mark 20 within the plane lying along the surface 1c of the wafer 1, or when the inclination angle is small (i.e., 45° or less), a relatively large number of dots included in the linear portion is not irradiated by infrared rays of one infrared unit. This causes an inadequate image pickup with regard to the linear portion of the identification mark 20 because a part of the linear portion is not photographed.

In the identification mark reading apparatus C in which the optical axis of another infrared unit crosses the optical axis of one infrared unit at a right angle or obtuse angle in the plane lying along the surface 1c of the wafer 1, wherein the optical axis of another infrared unit perpendicularly intersects the longitudinal direction of the linear portion of the identification mark 20, or it is inclined by a large inclination angle (i.e., 45° or more). This reduces the number of dots (included in the linear portion) not irradiated with infrared rays; hence, it is possible to produce a clear image of the linear portion of the identification mark 20.

The same angle can be set to both the incidence angles, by which infrared rays of the infrared units 13A and 13B are incident on the surface 1c of the wafer 1; or different angles can be set to them. However, different incidence angles are preferable because the apparatus C can cope with various types of identification marks, which differ from each other in the heights and depths of micro projections and recesses (i.e., irregularities), shape, reflection ratios on surfaces, and the degree of roughness.

Both infrared rays of the infrared units 13A and 13B can have the same wavelength, or have different wavelengths. However, different wavelengths are preferable because the apparatus C can cope with various types of identification marks, which differ from each other in heights and depths of micro projections and recesses (i.e., irregularities), shapes, reflection ratios on surfaces, and degrees of roughness.

Due to the provision of the polarizer 30 in the identification mark reading apparatus C, the infrared camera 16 can selectively receive reflected rays in a prescribed polarization direction that differs from the directions of reflected rays reflected at the planar surface 1c of the wafer 1 except for the identification mark forming region, thus picking up an easily-readable image of the identification mark 20.

Figure 15:
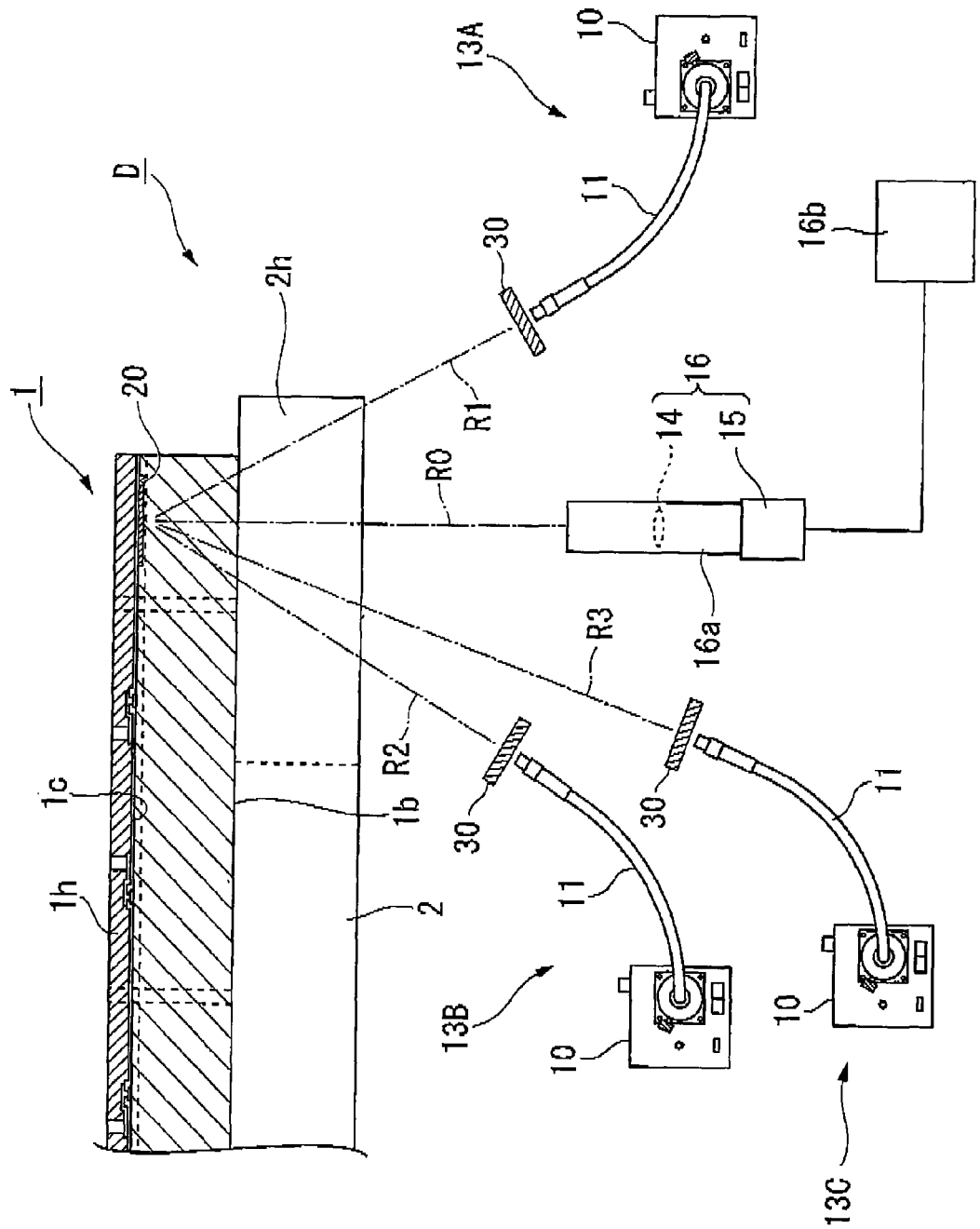
FIG. 15 is a diagram showing the positional relationship between three infrared units and one infrared camera, which are included in an identification mark reading apparatus according to a second variation of the second embodiment.

FIG. 15 shows a second variation of the second embodiment, i.e. an identification mark reading apparatus D equipped with three infrared units 13A, 13B, and 13C in connection with the infrared camera 16.

In the identification mark reading apparatus D, an inter-axis angle between the optical axes of two of the infrared units 13A, 13B, and 13C (i.e. the optical axes R1 and R2 of the infrared units 13A and 13B) intersect each other at a right angle or obtuse angle, and the optical axis of another infrared unit (i.e. the optical axis R3 of the infrared unit 13C) is set such that an inter-axis angle formed with the optical axis of one of the other two infrared units (i.e. the optical axis R1 of the infrared unit 13A or the optical axis R2 of the infrared unit 13B) is set to either zero or an acute angle. Alternatively, all the inter-axis angles between the optical axes R1, R2, and R3 of the infrared units 13A, 13B, and 13C can each be set to an obtuse angle.

In the identification mark reading apparatus D, each of the infrared units 13A, 13B, and 13C is equipped with the polarizer 30, and the infrared camera 16 can be equipped with the polarizer 30. Of course, each of the infrared units 13A to 13C and the infrared camera 16 can be equipped with the polarizer 30.

Figure 16:
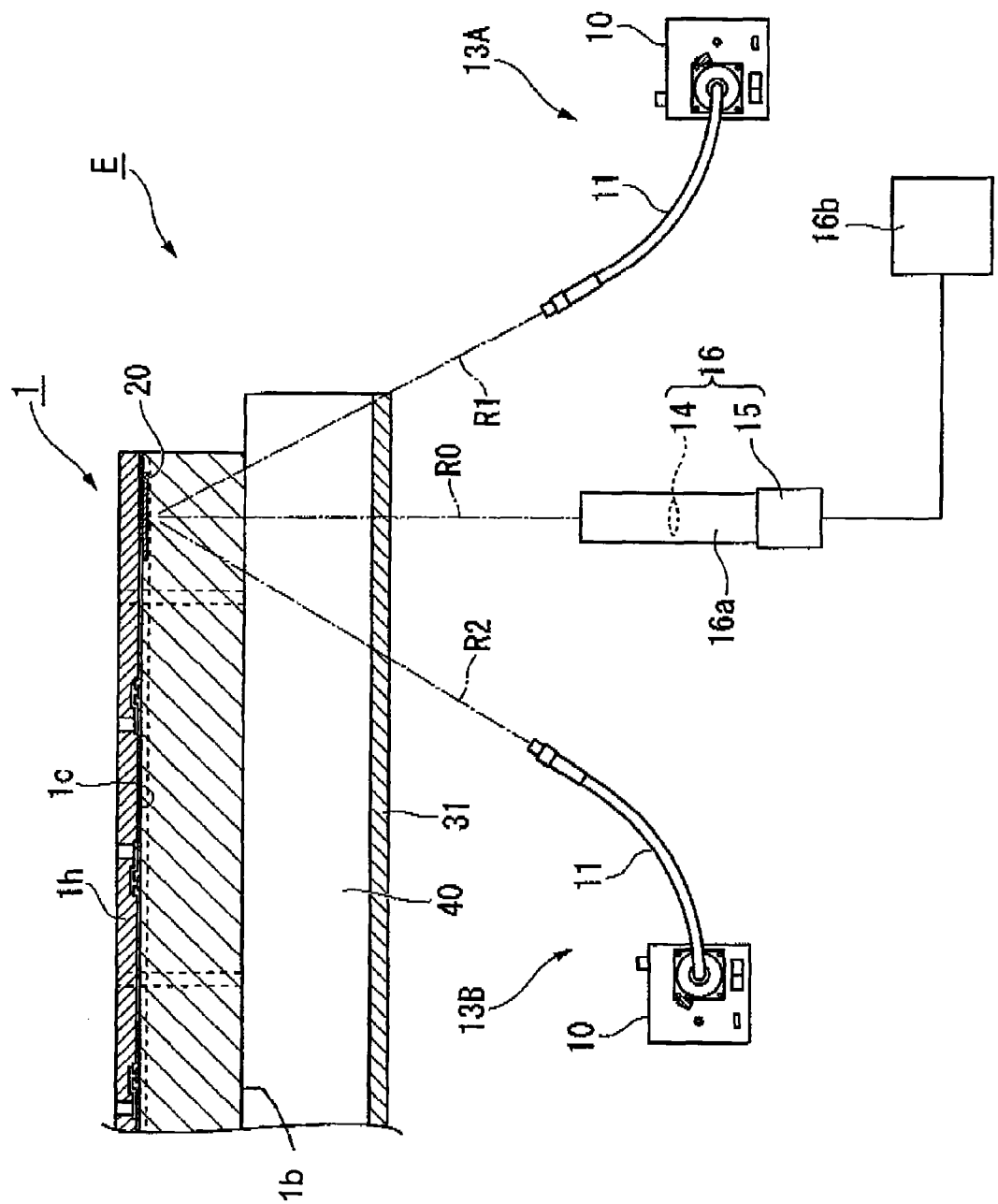
FIG. 16 is a diagram showing the positional relationship between two infrared units and one infrared camera, which are included in an identification mark reading apparatus according to a third variation of the second embodiment.

FIG. 16 shows a third variation of the second embodiment, i.e. an identification mark reading apparatus E equipped with two infrared units 13A and 13B and one infrared camera 16, wherein a stage 40 for mounting the wafer 1 is composed of a transparent material such as a quartz glass, and wherein a polarizer 31 is adhered to the backside of the stage 40.

In the above, infrared rays of the infrared units 13A and 13B are irradiated towards the backside 1b of the wafer 1 so as to reach the surface 1c of the wafer 1 via the polarizer 31; then, reflected rays propagate via the polarizer 31 and are then received by the infrared camera 16. This reduces the number of infrared rays reflected at the planar surface 1c of the wafer 1 except for the identification mark forming region, and this also reduces the number of rays reflected on the surface 1c of the wafer 1; hence, it is possible to produce a clear image of the identification mark 20.

Compared with the identification mark reading apparatuses C and D according to the first and second variations of the second embodiment, the identification mark reading apparatus E according to the third variation of the second embodiment does not require the polarizer 30 to be attached to each of the infrared units 13 and 13B; hence, it achieves a high operability and performability because it does not need to adjust the position and direction of the polarizer 30.

Since the stage 40 for mounting the wafer 1 is composed of the transparent material, it is unnecessary to form the recess 2h, which is required in the stage 2 in the second embodiment and its first and second variations. Of course, the stage 2 having the recess 2h adapted to each of the second embodiment and its first and second variations can be replaced with the "transparent" stage 40. Since the transparent stage 40 does not require the recess 2h, the optical axes R1 and R2 of the infrared units 13A and 13B and the optical axis R0 of the optical system of the infrared camera 16 are not necessarily defined by the position of the recess 2h; hence, it is possible to set the optical axes R0, R1, and R2 in a broad range of angles; thus it is possible to improve the degree of freedom in designing. Due to the transparency of the stage 40, the identification mark reading apparatus E is capable of easily reading the identification mark 20, which is formed at any position on the surface 1c of the wafer 1.

Figure 17:
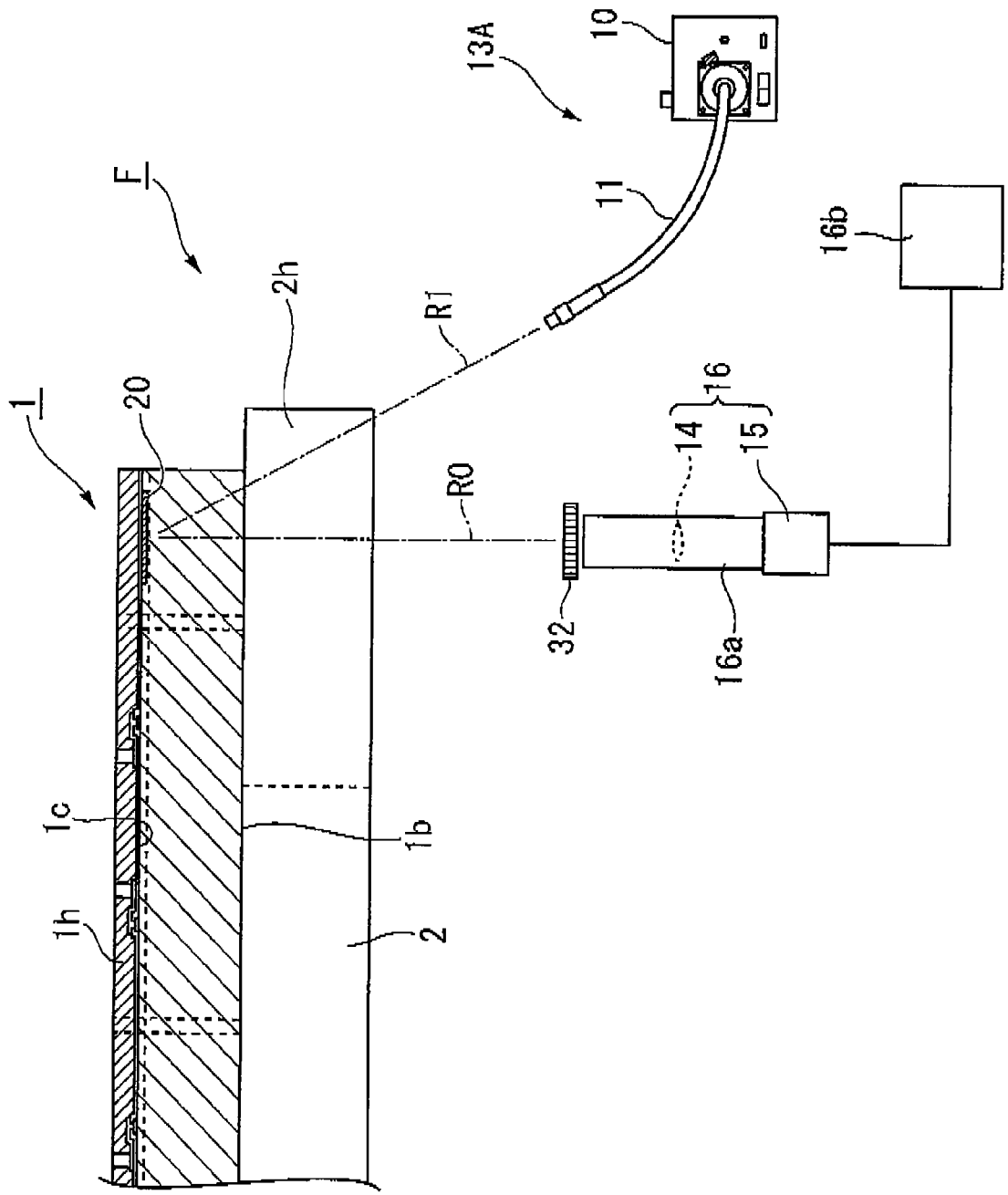
FIG. 17 is a diagram showing the positional relationship between one infrared unit and one infrared camera, which are included in an identification mark reading apparatus according to a fourth variation of the second embodiment.

FIG. 17 shows a fourth variation of the second embodiment, i.e. an identification mark reading apparatus F, which is equipped with the stage 2, the infrared unit 13A, and the infrared camera 16 as similar to the identification mark reading apparatus B shown in FIG. 10. The identification mark reading apparatus F is characterized in that, as an optical transmission limiter (for limiting transmission of infrared rays), a micro-louver film 32 is used instead of the polarizer 30 and is positioned in proximity to the front end of the infrared camera 16. The micro-louver film 32 is formed by laminating a film having micro louvers with a cover film, wherein the transmission direction can be appropriately controlled in response to the angles and the distances between of louvers, and the thickness of the film.

In the identification mark reading apparatus F, the micro-louver film 32 transmits infrared rays perpendicularly incident thereto while blocking infrared rays slantingly incident thereto at inclination angles. The optical axis R1 of the infrared unit 13A is inclined to the planar portion of the surface 1c of the wafer 1, i.e. the entire planar surface 1c of the wafer 1 other than the identification mark forming region. That is, a relatively large incidence angle is set to the optical axis R1 of the infrared unit 13A, the infrared camera 16 is positioned just below the wafer 1 such that the optical axis R0 thereof substantially matches the perpendicular of the surface 1c of the wafer 1, wherein the micro-louver film 32 is arranged in proximity to the front end of the infrared camera 16.

In the aforementioned positioning, infrared rays output from the infrared unit 13A are reflected at the surface 1c of the wafer 1; then, a part of the reflected rays transmitted through the micro-louver film 32 is received by the infrared camera 16. The infrared camera 16 is positioned to be deviated from regularly reflected rays regularly reflected at the planar portion of the surface 1c of the wafer 1; hence, the infrared camera 16 does not receive regularly reflected rays but it receives reflected rays, which are perpendicularly reflected at the surface 1c and are transmitted through the micro-louver film 32. This reduces the amount of reflected rays reflected at the planar surface 1c of the wafer 1 except for the identification mark forming region; hence, the infrared camera 16 receives a relatively large amount of reflected rays reflected at the identification mark forming region. Thus, it is possible to easily produce a clear image of the identification mark 20. This makes it possible for the human operator to easily read the identification mark 20.

The second embodiment and its variations are described with reference to FIGS. 10 to 17; but this is not a restriction; hence, they can be further modified as described below.

The polarizer 30 and the micro-louver film 32 can be located at an intermediate position in the thickness direction of the stage 2. For example, they can each be positioned in proximity to any one infrared unit within the range between the infrared unit and the stage 2. Alternatively, they can each be positioned in proximity to the infrared camera 16 within the range between the infrared camera 16 and the stage 2.

As the optical transmission limiter, one of the polarizer 30 and the micro-louver film 32 is used; but they can be collectively used in the identification mark reading apparatus. For example, the polarizer 30 is positioned in proximity to any one infrared unit, while the micro-louver film 32 is positioned in proximity the infrared camera 16. It is possible to provide the infrared camera 16 with both the polarizer 30 and the micro-louver film 32.

The identification mark reading apparatus is not necessarily constituted of the stage 2, the first image pickup device 3, the second image pickup device 4, the first case mount 6, the second case mount 8, and the transport unit 9; that is, the present embodiment requires that the identification mark reading apparatus be equipped with at least the second image pickup device 4. That is, the second image pickup device 4 is installed in an exterior inspection device included in manufacturing processes of semiconductor devices so as to perform an exterior inspection by the use of stages, transport units, and mounts already installed therein, wherein the identification mark 20 of the wafer 1 is read during the exterior inspection.

The first image pickup device 3 is not necessarily used to specify the position of the wafer 1. Instead, the first image pickup device 3 picks up an image for use in exterior inspection, or it can be used to read the identification mark 20 of the wafer 1 before formation of the resin layer 1h.

The present embodiment is described such that the wavelength of infrared rays output from the infrared source 10 ranges from 1100 nm to 8000 nm; however, the wavelength is not necessarily limited as long as it lies in the range of the infrared radiations.

The wafer 1 is not necessarily composed of a polycrystal silicon or a monocrystal silicon; that is, the material of the wafer 1 is not necessarily limited to silicon.

In the present embodiment, infrared rays of the infrared units 13A to 13C are irradiated to the wafer 1, in which dicing tapes are adhered to the backside 1b or individual pieces after dicing are held together via dicing tapes, wherein infrared rays transmit through dicing tapes so as to read the identification mark 20 formed on the surface 1c.

In the present embodiment, diameters of dots forming the identification mark 20 range from 20 μm to 500 μm, whereas the identification mark reading apparatus is capable of reading the identification mark 20 constituted of dots having very small diameters.

3. Third Embodiment

An identification mark reading apparatus G according to a third embodiment of the present invention will be described with reference to FIGS. 18 and 19, wherein parts identical to those shown in the foregoing drawings are designated by the same reference numerals. The identification mark reading apparatus G is designed to read the identification mark 20 formed on the surface 1c of the wafer 1 before or after dicing of the wafer 1.

The detailed structure of the wafer 1 is shown in FIGS. 7 and 8, which have been already described in conjunction with the first embodiment.

The identification mark reading apparatus G of the third embodiment is constituted of the stage 2 for mounting the wafer 1, the first image pickup device 3, the second image pickup device 4, the first case 5, the first case mount 6, the second case 7, the second case mount 8, and the transport unit 9, which are already described in the first embodiment with reference to FIGS. 5 and 6.

Figure 18:
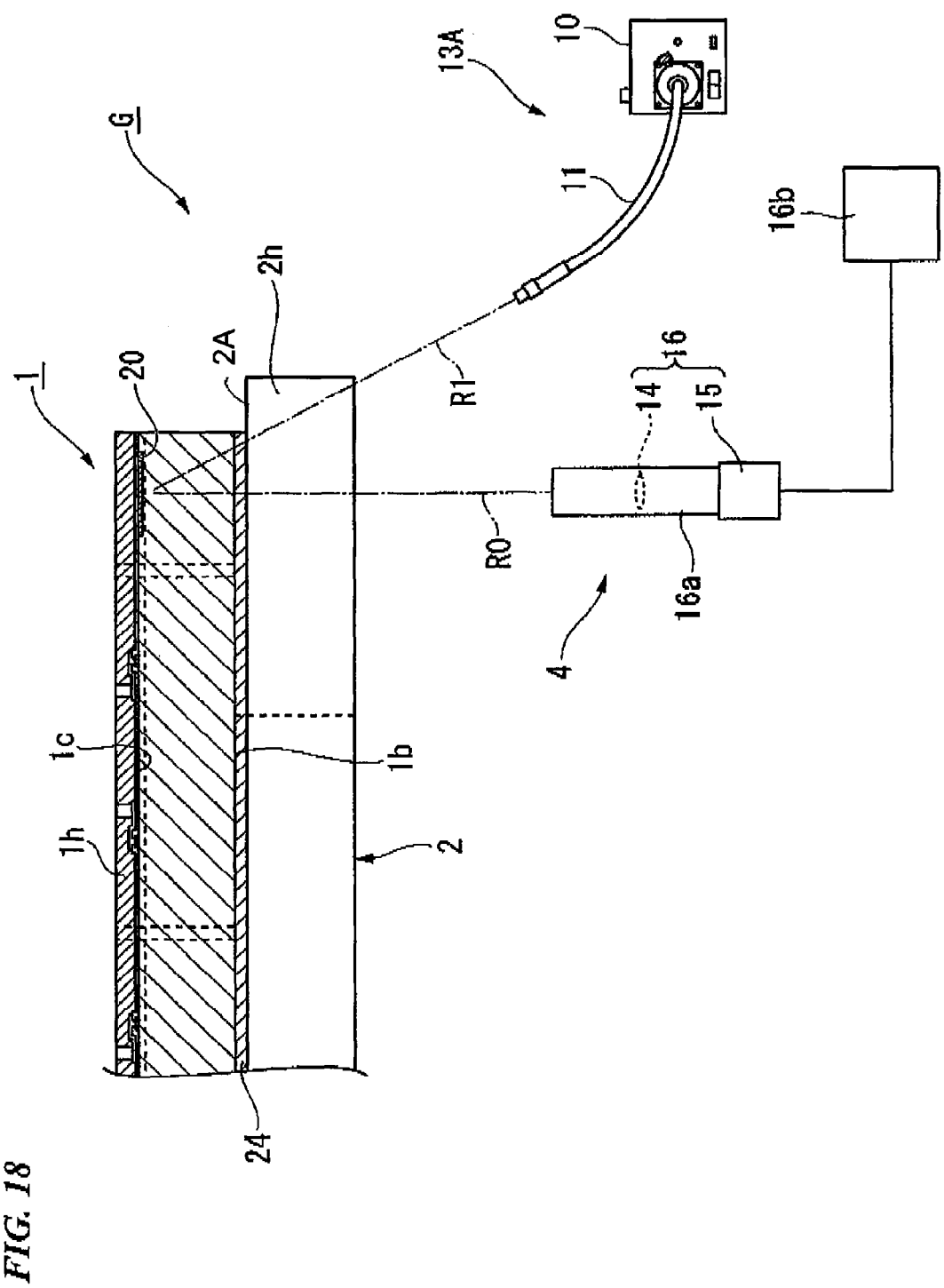
FIG. 18 is a diagram showing the positional relationship between an infrared unit and an infrared camera, which are included in an identification mark reading apparatus for reading an identification mark formed on a surface of a wafer in accordance with a third embodiment of the present invention.
Figure 19:
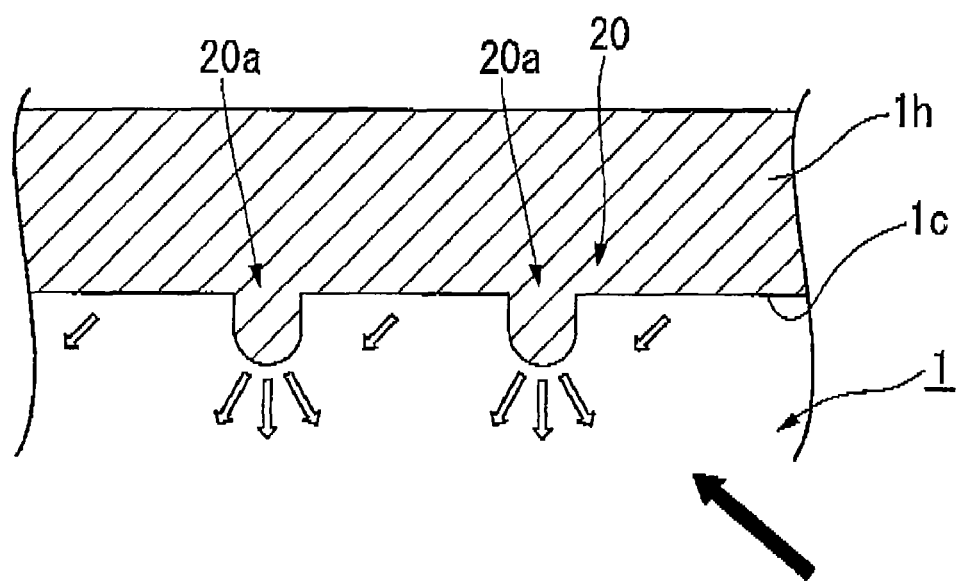
FIG. 19 is a diagram showing the relationship between infrared rays, which are irradiated onto the backside of the wafer, and reflected rays reflected by the surface and the identification mark in accordance with the third embodiment of the present invention.

Since the identification mark reading apparatus G of the third embodiment is used before or after the dicing of the wafer 1, as shown in FIG. 18, the wafer 1 is mounted on the surface 2a of the stage 2 in such a way that a dicing tape 24 adhered to the backside 1b of the wafer 1 comes in contact with the surface 2a of the stage 2, wherein the dicing tape 24 is composed of a resin material allowing infrared rays of a prescribed wavelength (which transmit through the wafer 1) to transmit therethrough. As the resin material of the dicing tape 24, it is possible to list polyethylene terephthalate (PET), polyvinyl chloride (PVC), low-density polyethylene (LDPE), polystyrene (PS), and polypropylene (PP), for example. It is preferable that the transmission ratio of infrared rays in the dicing tape 24 be set to 50% or more, and more preferably to 80% or more.

Detailed structures of the first image pickup device 3 and the second image pickup device 4 are shown in FIG. 6 and are already described in conjunction with the first embodiment. In the third embodiment, as shown in FIG. 18, the optical axis R1 of the infrared unit 13A is inclined with an acute angle with respect to the perpendicular of the surface 1c of the wafer 1.

In the third embodiment, the second end of the fiber bundle 11 is directed to the recess 2h of the stage 2; hence, the optical axis R1 of infrared rays output from the second end of the fiber bundle 11 of the infrared unit 13A is set to pass through the recess 2h of the stage 2 so that infrared rays directly reach the backside 1b of the wafer 1 mounted on the stage 2. Infrared rays are transmitted through the dicing tape 24 and the wafer 1, wherein they propagate towards the surface 1c of the wafer 1 forming the interface with the resin layer 1h from the backside 1b. Herein, the wafer 1 may absorb infrared rays whose wavelength ranges from 1000 nm to 9000 nm; hence, it is preferable that the wavelength of infrared rays output from the infrared source 10 ranges from 1100 nm to 8000 nm, and more preferably ranges from 1500 nm to 5000 nm.

It is preferable that the infrared radiation absorption range of the dicing tape 24 ranges from 2000 nm to 2300 nm. Specifically, the infrared radiation absorption ranges of the dicing tape 24 is set between 1100 nm to 2300 nm. Some material of the dicing tape 24 may set the infrared radiation absorption range between 1100 nm and 2000 nm. In the case of PET, for example, it is preferable that the infrared radiation absorption range is set between 1100 nm and 2100 nm.

The second image pickup device 4 includes the infrared camera 16, the details of which are already described in conjunction with the first embodiment. In the third embodiment, the optical axis R0 of the infrared camera 16 is set to pass through the recess 2h of the stage 2 and to reach the backside 1b of the wafer 1 mounted on the stage 2, wherein it crosses the optical axis R1 of the infrared unit 13A in a different direction with respect to the surface 1c of the wafer 1. That is, the optical axis R0 of the infrared camera 16 is set to cross the optical axis of regularly reflected rays (corresponding to infrared rays of the infrared unit 13A regularly reflected at the planar surface 1c of the wafer 1). In FIG. 18, the optical axis R0 of the infrared camera 16 perpendicularly directed to the surface 1c of the wafer 1. That is, the infrared camera 16 is positioned to not directly receive regularly reflected rays (corresponding to infrared rays of the infrared unit 13A regularly reflected at the planar surface 1c of the wafer 1).

Next, a method for reading the identification mark 20 formed on the surface 1c of the wafer 1 will be described with respect to the third embodiment of the present invention, in which handles the wafer 1 in which the dicing tape 24 is adhered to the backside 1b. Similar to the first embodiment, the wafer 1 having the dicing tape 24 is transported onto the stage 2 by means of the transport unit 9.

The second image pickup device 4 picks up an image of the identification mark 20 formed on the surface 1c of the wafer 1 mounted on the stage 2.

The infrared source 10 outputs infrared rays, which are then irradiated from the second end of the fiber bundle 11 of the infrared unit 13A towards the backside 1b of the wafer 1 via the recess 2h of the stage 2.

Since the wavelength of infrared rays irradiated onto the backside 1b of the wafer 1 ranges from 1100 nm to 8000 nm, they may be sequentially transmitted through the dicing tape 24 and the wafer 1. Transmitted infrared rays may hardly be absorbed by and transmitted through the resin layer 1h; hence, a relatively large amount of them are reflected at the interface between the resin layer 1h and the surface 1c of the wafer 1.

Reflected rays transmit through the wafer 1 and the dicing tape 24 so as to propagate outside of the wafer 1; then, they are received and converged by the lens 14 of the infrared camera 16, in which the image pickup 15 produces an image. That is, infrared camera 16 picks up the image of the identification mark 20 formed on the surface 1c of the wafer 1, so that image signals are sent to the display 16b connected to the image pickup 15 via the line, thus displaying the image on the screen. By visually recognizing the displayed image, it is possible to read the identification mark 20 formed on the surface 1c of the wafer 1 sealed with the resin layer 1h.

Since the planar surface is formed in the surface 1c of the wafer 1 except for the identification mark forming region, infrared rays of the infrared unit 13A are regularly reflected at the planar surface 1c of the wafer 1, while they are irregularly reflected at the identification mark forming region (including the identification mark 20 having irregularities).

The optical axis R0 of the infrared camera 16 is set such that the infrared camera 16 does not receive regularly reflected rays; hence, the infrared camera 16 receives a part of irregularly reflected rays, which propagates in a prescribed direction within irregularly reflected rays reflected at the identification mark forming region.

After completion of the image pickup operation described above, the wafer 1 is transported to the second case 7 by means of the transport unit 9. This is already described in conjunction with the first embodiment.

In the identification mark reading apparatus G of the third embodiment, the dicing tape 24 having a high transmission ratio of infrared rays is adhered onto the backside 1b of the wafer 1, wherein infrared rays irradiated onto the backside 1b of the wafer 1 are sequentially transmitted through the dicing tape 24 and the wafer 1. In addition, reflected rays reflected at the interface between the resin layer 1h and the surface 1c of the wafer 1 are sequentially transmitted through the wafer 1 and the dicing tape 24. The infrared camera 16 receives reflected rays so as to produce the image of the interface. This makes it possible to easily read the identification mark 20 formed on the surface 1c of the wafer 1 even when the surface 1c of the wafer 1 is sealed with the resin layer 1h, and the dicing tape 24 is adhered to the backside 1b of the wafer 1; thus, it is possible to specify the lot number of the wafer 1.

Since the optical axis R0 of the infrared camera 16 is set such that the infrared camera 16 does not directly receive regularly reflected rays corresponding to infrared rays of the infrared unit 13A regularly reflected at the planar surface 1c of the wafer 1, it is possible to prevent the infrared camera 16 from picking up the image of the planar surface 1c except for the identification mark forming region; that is, it is possible to easily produce an image showing only the identification mark 20.

In the third embodiment, the optical axis R0 of the infrared camera 16 can be positioned in parallel with the propagation direction of regularly reflected rays. In this case, however, the infrared camera 16 may receive regularly reflected rays reflected at the interface between the resin layer 1h and the surface 1c of the wafer 1. That is, the image produced by the infrared camera 16 may include a bright image representing the planar surface 1c of the wafer 1 except for the identification mark forming region and a dark image representing the identification mark.

The dicing tape 24 is not necessarily composed of the foregoing material simply allowing infrared rays to transmit therethrough but is composed of a polarizing material for reducing S polarizing components, for example. That is, the dicing tape 24 allows infrared rays or reflected rays including a relatively large amount of P polarizing components to be transmitted therethrough while blocking other component from being transmitted therethrough.

In the above, infrared rays of the infrared unit 13A are transmitted towards the interface via the dicing tape 24, by which they include a relatively large amount of P polarizing components while substantially excluding S polarizing components. In general, reflected rays at the planar surface 1c of the wafer 1 except for the identification mark forming region are enhanced in S polarizing components (which may vibrate in parallel with the planar surface 1c) but are diminished in P polarizing components (which may vibrate perpendicular to the planar surface 1c). This phenomenon becomes apparent when the incidence angle of infrared rays ranges from 50° to 85°, specifically ranges from 60° to 80°, and more specifically ranges from 65° to 75°.

When infrared rays whose P polarizing components are enhanced rather than S polarizing components are reflected at the interface, P polarizing components included in reflected rays are greatly reduced; hence, reflected rays are very weak in terms of P polarizing components. Infrared rays are irregularly reflected at the identification mark forming region; hence, irregularly reflected rays at the identification mark forming region are relatively weak in terms of P polarizing components.

When the aforementioned reflected rays are transmitted through the dicing tape 24, they are further reduced in S polarizing components; hence, the infrared camera 16 receives reflected rays substantially including only P polarizing components. That is, the infrared camera 16 may not receive regularly reflected rays at the planar surface 1c of the wafer except for the identification mark forming region but substantially receives irregularly reflected rays at the identification mark forming region; hence, it is possible to produce a clear and bright image of the identification mark 20. When the dicing tape 24 is composed of the foregoing polarizing material, the image produced by the infrared camera 16 may include a bright image of the identification mark 20 and a dark image of the planar surface 1c of the wave except for the identification mark forming region irrespective of whether the optical axis R0 of the infrared camera 16 and the propagation direction of regularly reflected rays cross each other or lie in parallel with each other.

Figure 20:
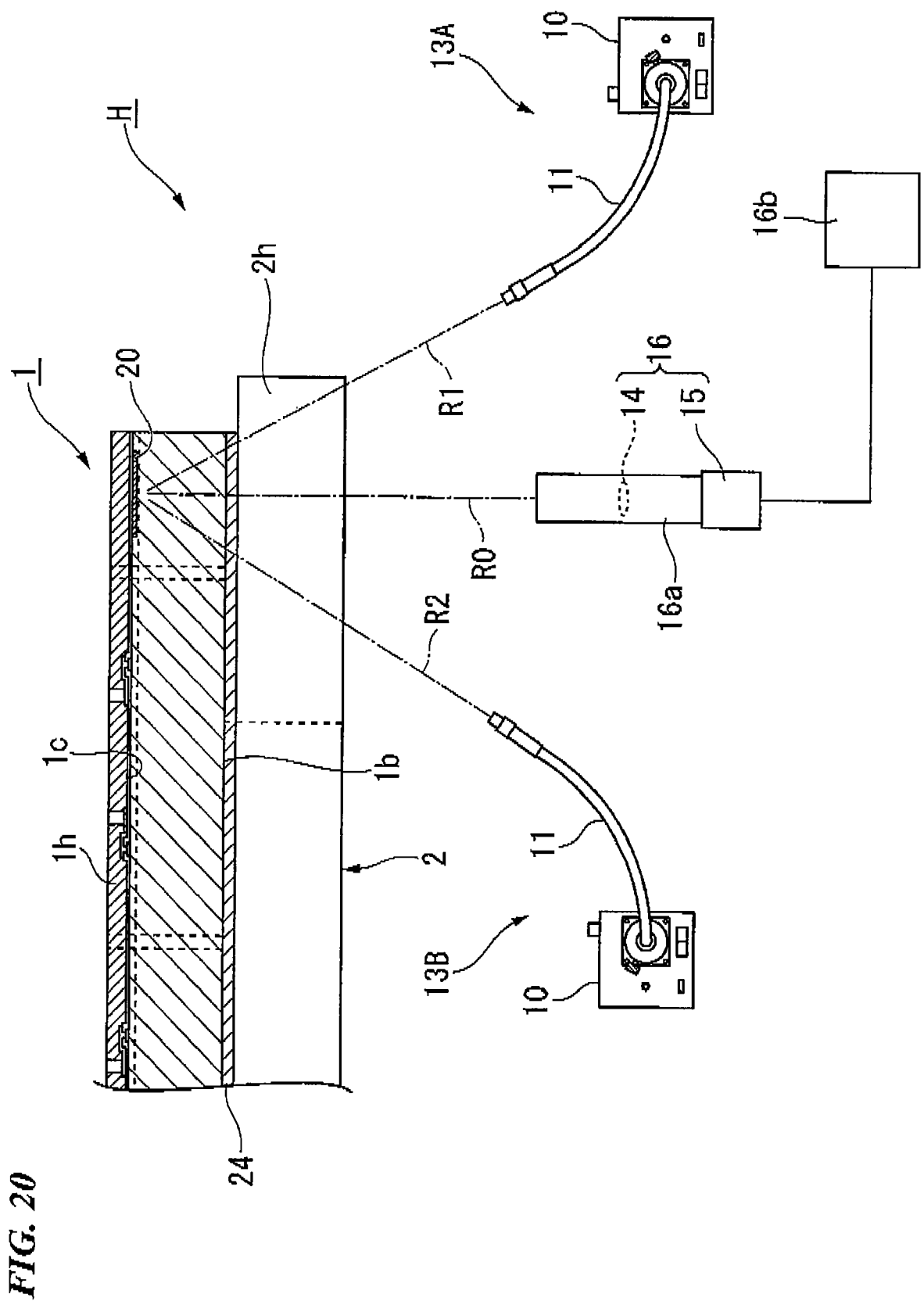
FIG. 20 is a diagram showing the positional relationship between two infrared units and an infrared camera, which are included in an identification mark reading apparatus in accordance with a modified example of the third embodiment.

FIG. 20 shows a modified example of the third embodiment, i.e. an identification mark reading apparatus H which is equipped with two infrared units 13A and 13B in connection with the infrared camera 16. Similar to the identification mark reading apparatus G, the identification mark reading apparatus H reads the identification mark 20 formed on the surface 1c of the wafer 1, in which the dicing tape 24 composed of polyethylene terephthalate is attached to the backside 1b.

Figure 21:
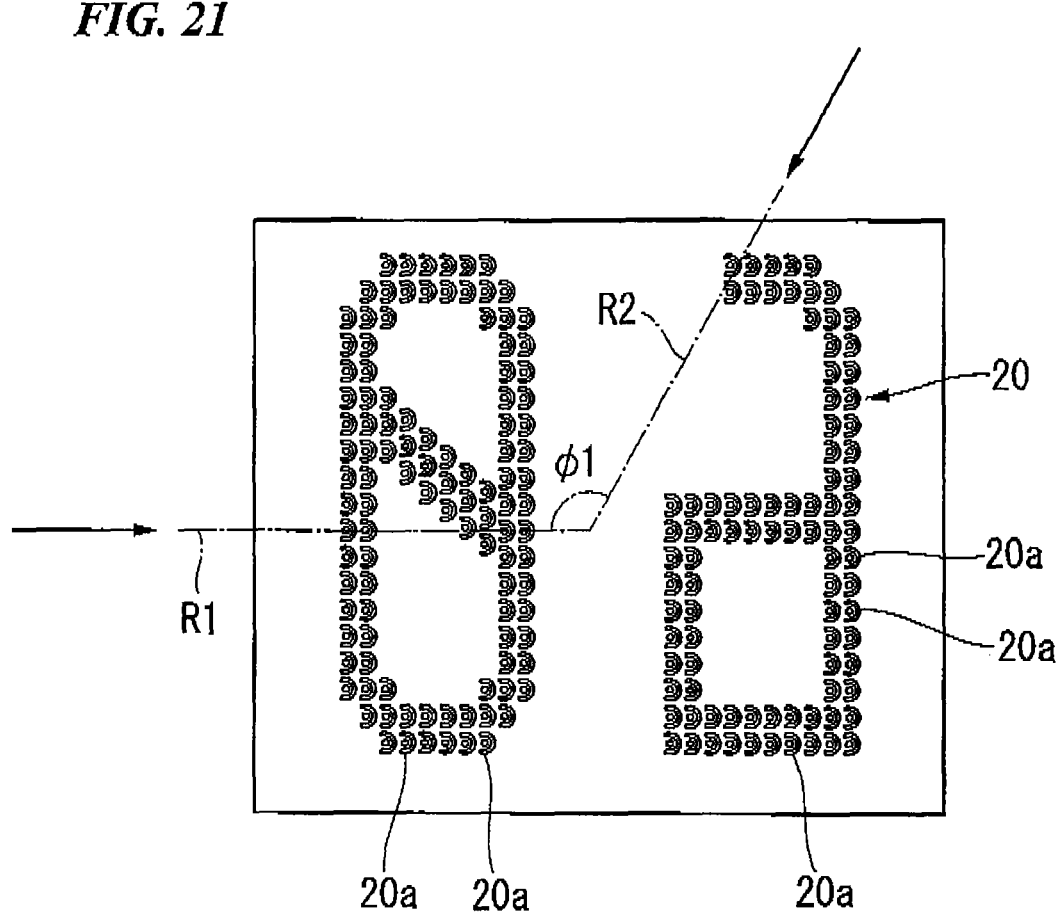
FIG. 21 is an enlarged plan view of the identification mark, which is read by two infrared units and one infrared camera in accordance with the modified example of the third embodiment.

As shown in FIG. 21, the optical axes R1 and R2 of the infrared units 13A and 13B intersect each other at a right angle or an obtuse angle in a plane lying along the surface 1c of the wafer 1. Specifically, the inter-axis angle φ1 formed between the optical axes R1 and R2 of the infrared units 13A and 13B ranges from 90° to 170°, preferably ranging from 120° to 160°, and more preferably set to 150°. As shown in FIG. 20, the optical axis R0 of the infrared camera 16 is set substantially perpendicular to the surface 1c of the wafer 1 so as to not directly receive regularly reflected rays corresponding to infrared rays of the infrared units 13A and 13B regularly reflected at the planar surface 1c of the wafer 1.

Since the infrared units 13A and 13B irradiate infrared rays towards the surface 1c of the wafer 1 in different directions, the identification mark reading apparatus H is capable of easily recognizing linear portions included in the identification mark 20 shown in FIG. 21.

The third embodiment is not necessarily limited to the identification mark reading apparatuses G and H; that is, it is possible to arrange three or more infrared units. In this case, the third embodiment requires that the inter-axis angle formed between two of the optical axes of three or more infrared units is set to a right angle or an obtuse angle, while the inter-axis angle formed between the optical axis of another infrared unit and the optical axes of two infrared units is set to zero or an obtuse angle. In this connection, the inter-axis angles between the optical axes of three infrared units can all be set to an obtuse angle.

Similar to the first and second embodiments, each of the identification mark reading apparatuses G and H according to the third embodiment is not necessarily constituted of the stage 2, the first image pickup device 3, the second image pickup device 4, the first case mount 6, the second case mount 8, and the transport unit 9. That is, the third embodiment simply requires that the identification mark reading apparatus be equipped with at least the second image pickup device 4. That is, the second image pickup device 4 is installed in an exterior inspection device installed in manufacturing processes of semiconductor devices so as to perform an exterior inspection by use of stages, transport units, and mounts already installed therein, wherein the identification mark 20 of the wafer 1 is read during the exterior inspection.

The first image pickup device 3 is not necessarily used to specify the position of the wafer 1. Instead, the first image pickup device 3 picks up an image for use in exterior inspection, or it can be used to read the identification mark 20 of the wafer 1 before formation of the resin layer 1h.

The recess 2h allowing infrared rays or reflected rays to pass therethrough is not necessarily formed in the stage 2. That is, the stage 2 can be composed of a transparent material such as quartz glass allowing infrared rays to pass therethrough.

In the above, the stage 2 does not need the recess 2h, the optical axes R1 and R2 of the infrared units 13A and 13B and the optical axis R0 of the infrared camera 16 are not necessarily limited by the recess 2h; that is, they can be set in a broad range of angles. In other words, it is possible to easily set the inter-axis angles between the optical axes R0, R1, and R2, for example. Since the recess 2h is not formed in the stage 2, it is possible to easily read the identification mark 20 that is formed at any position on the surface 1c of the wafer 1.

The resin layer 1h can be composed of resin materials such as polyethylene terephthalate (used for the dicing tape 24) and polarizing materials, which allow infrared rays to be transmitted therethrough. In this case, infrared rays are irradiated towards the surface 1c of the wafer 1 from the resin layer 1h. That is, infrared rays are sequentially transmitted through the resin layer 1h, the wafer 1, and the dicing tape 24; then, they are received by the infrared camera 16 so as to pick up an image regarding the surface 1c of the wafer 1, thus reading the identification mark 20.

Specifically, when infrared rays are incident on the planar surface 1c of the wafer 1 except for the identification mark forming region within the interface, they are refracted in a direction dependent upon the difference between the refraction factors of the resin layer 1h and the wafer 1, so that refracted rays transmit through the wafer 1 and the dicing tape 24. When infrared rays are incident on the identification mark forming region having irregularities within the interface, they are irregularly reflected in various directions so as to pass through the wafer 1.

When the optical axis R0 of the infrared camera 16 substantially matches the optical axis of transmitted rays corresponding to infrared rays that are irradiated onto the planar surface 1c except for the identification mark forming region and are then transmitted through the wafer 1 and the dicing tape 24, the image produced by the infrared camera 16 may include a dark image of the identification mark 20, which is darker than the image of the planar surface 1c except for the identification mark forming region. When the optical axis R0 does not match the optical axis of transmitted rays, the image produced by the infrared camera 16 may include a bright image of the identification mark 20, which is brighter than the image of the planar surface 1c except for the identification mark 20.

This increases the contrast between the identification mark 20 and the planar surface 1c in the image produced by the infrared camera 16; hence, it is possible to easily read the identification mark 20.

The third embodiment is described such that the wavelength of infrared rays output from the infrared source 10 ranges from 1100 nm to 2300 nm (or 2000 nm), for example. The wavelength is not necessarily limited to the aforementioned range as long as infrared rays at not absorbed in the dicing tape 24.

The wafer 1 is not necessarily composed of a polycrystal silicon or monocrystal silicon; that is, the material of the wafer 1 is not necessarily limited to silicon.

Lastly, the present invention is not necessarily limited to the first, second, and third embodiments and their variations, which can be further modified in a variety of ways within the scope of the invention as defined in the appended claims.

What is claimed is:

1. A method for reading an identification mark formed on a surface of a wafer sealed with a resin layer, comprising:
attaching a dicing tape ensuring transmission of infrared radiation onto a backside of the wafer, wherein the dicing tape is composed of a polarizing material for reducing S polarizing components in the infrared rays;
irradiating infrared rays towards the surface of the wafer from the backside; and
receiving reflected rays corresponding to the infrared rays, which are sequentially transmitted through the dicing tape and the wafer and are then reflected at an interface between the resin layer and the surface of the wafer, thus picking up an image of the interface including the identification mark composed of irregularities.

2. The method for reading an identification mark formed on the surface of a wafer according to claim 1, wherein the infrared rays are irradiated along multiple optical axes lying in different directions towards the surface of the wafer, so that a part of the reflected rays, which is reflected at the interface in a prescribed direction, is received so as to pick up the image of the interface including the identification mark.

* * * * *